United States Patent [19]
Walker et al.

[11] Patent Number: 6,128,598
[45] Date of Patent: *Oct. 3, 2000

[54] SYSTEM AND METHOD FOR GENERATING AND EXECUTING INSURANCE POLICIES FOR FOREIGN EXCHANGE LOSSES

[75] Inventors: Jay S. Walker, Ridgefield; James A. Jorasch, Stamford, both of Conn.

[73] Assignee: Walker Digital, LLC, Stamford, Conn.

[*] Notice: This patent is subject to a terminal disclaimer.

[21] Appl. No.: 09/262,810

[22] Filed: Mar. 5, 1999

Related U.S. Application Data

[63] Continuation of application No. 08/749,241, Nov. 15, 1996, Pat. No. 5,884,274.

[51] Int. Cl.[7] ................................................ G06F 17/60
[52] U.S. Cl. .................................. 705/4; 235/379; 705/1; 705/35; 705/38
[58] Field of Search .................................. 235/375, 379, 235/380, 381; 364/400; 380/9, 23, 24; 705/1, 4, 16, 17, 18, 24, 35, 38, 39, 44; 707/104

[56] References Cited

U.S. PATENT DOCUMENTS

| | | | |
|---|---|---|---|
| 4,766,539 | 8/1988 | Fox | 705/4 |
| 5,262,942 | 11/1993 | Earle | 705/37 |
| 5,319,542 | 6/1994 | King, Jr. et al. | 705/27 |
| 5,446,885 | 8/1995 | Moore et al. | 707/103 |
| 5,465,206 | 11/1995 | Hilt et al. | 705/40 |
| 5,475,585 | 12/1995 | Bush | 705/26 |
| 5,630,127 | 5/1997 | Moore et al. | 707/104 |
| 5,644,721 | 7/1997 | Chung et al. | 705/6 |
| 5,659,165 | 8/1997 | Jennings et al. | 235/379 |
| 5,704,045 | 12/1997 | King et al. | 705/35 |
| 5,884,274 | 3/1999 | Walker et al. | 705/4 |

FOREIGN PATENT DOCUMENTS

WO 9821680  5/1998  WIPO.

OTHER PUBLICATIONS

John Hicks; "Middle East Upturn for Construction Groups"; Financial Times (london), Apr. 19, 1982.

Ashfaq M. Ishaq; "Reports: Utilities Forum"; Institutional Investor; Oct. 1993 at p. 116.

Allan I. Menclowitz; "Export Finance–Comparative Analysis of U.S. and European Union Export Credit Agencies"; GAO Reports, Oct. 24, 1995.

*Primary Examiner*—Edward R. Cosimano
*Attorney, Agent, or Firm*—Patrick J. Buckley; Peter J. Vogel

[57] ABSTRACT

A system and method for providing a foreign exchange insurance policy that automatically considers factors such as the type of currency, exchange rate, amount of coverage, and period of coverage, to determine a premium. Users can access the system using credit cards, ATMs, banks or other media.

26 Claims, 22 Drawing Sheets

POLICY REQUIREMENTS DATABASE 260

| END USER ID NUMBER | CREDIT CARD NUMBER | CURRENCY | EXCHANGE RATE | START DATE | END DATE | AMOUNT OF COVERAGE | TRACKING NUMBER |
|---|---|---|---|---|---|---|---|
| GB45921 | 1245-4056-3240-2113 | FRENCH FRANC | 5.0 | 05/07/97 | 05/12/97 | $2,000 | 3819B |
| HT21990 | 3457-8854-2114-9191 | GERMAN MARK | 1.5 | 09/01/97 | 09/26/97 | $1,500 | 9233C |
| DL44087 | 3501-2224-6902-8787 | GERMAN MARK | 1.6 | 11/02/97 | 11/03/97 | $4,200 | 8115J |

FIG. 2A

| END USER ID NUMBER | INSURANCE POLICY TRACKING NUMBER | DATE GENERATED | POLICY REQUIREMENTS TRACKING NUMBER | STATUS |
|---|---|---|---|---|
| GB45921 | 75HK64 | 02/05/97 | 3819B | ACTIVE |
| HT21990 | 45SF19 | 02/14/97 | 9233C | PENDING |
| DL44087 | 26VK39 | 03/16/97 | 8115J | EXPIRED |

INSURANCE POLICY DATABASE 265

FIG. 2B

| INSURANCE POLICY TRACKING NUMBER | END USER ID NUMBER | AMOUNT OF TRANSACTION | DATE OF TRANSACTION | PREVAILING EXCHANGE RATE | BANK ID NUMBER |
|---|---|---|---|---|---|
| 75HK64 | GB45921 | $200 | 05/09/97 | 4.5 | 34MG |
| 45SF19 | HT21990 | $350 | 09/06/97 | 1.45 | 18FD |
| 26VK39 | DL44087 | $500 | 11/03/97 | 1.62 | 78RR |

TRANSACTION DATA DATABASE 270

SYSTEM AND METHOD FOR GENERATING AND EXECUTING INSURANCE POLICIES FOR FOREIGN EXCHANGE LOSSES

CROSS-REFERENCE TO RELATED APPLICATIONS

This application is a continuation of U.S. patent application Ser. No. 08/749,241 entitled "SYSTEM AND METHOD FOR GENERATING AND EXECUTING INSURANCE POLICIES FOR FOREIGN EXCHANGE LOSSES" filed in the name of Jay S. Walker and James A. Jorasch on Nov. 15, 1996, issued as U.S. Pat. No. 5,884,274 on Mar. 16, 1999.

BACKGROUND OF THE INVENTION

The present invention relates generally to foreign currency exchange, and more particularly to generating and executing insurance policies for foreign exchange losses.

Rapidly expanding global commerce and international travel have dramatically increased the need for foreign currency exchange. Foreign exchange rates are highly variable, and numerous factors influence the exchange rates, such as economic strength of countries, political stability, countries' transnational policies and relationships, and demand for foreign currency. Due to high variability and numerous factors influencing the exchange rates, it is extremely difficult to predict future exchange rates even for a short period.

Due to the unpredictable nature of the exchange rates, individual travelers may wish to lock in a favorable exchange rate before they travel to foreign countries, thus eliminating the need to purchase foreign currencies in advance. One way to protect against unpredictable fluctuation of exchange rates are forward currency contracts. These contracts give the buyer a right to purchase a certain amount of foreign currency at a specific price at a specific future time. Essentially, the buyer of the contract pays a premium for the right to purchase a large block of foreign currency at a fixed exchange rate.

Unfortunately, forward currency contracts involve large sums of money, and thus, are practical only for large institutions and international companies seeking to minimize currency exchange risks, or commercial currency traders. The size of forward currency contracts generally does not vary, nor can they be shared by a group of individuals. Additionally, there is little or no flexibility in specifying a range of coverage period because forward currency contracts must designate a specific date.

Accordingly, not only are these contracts restrictive, they do not offer avenues for individual consumers to hedge their personal currency risk. Instead, if individuals want to "lock in" a prevailing exchange rate, they must either purchase the foreign currency or an instrument denominated in the foreign currency, such as traveler's checks. The actual purchase, however, poses many disadvantages such as tying up funds, paying a commission, and foregoing the possibility of enjoying any favorable future fluctuations.

Therefore, it is desirable to provide a method of protecting individual consumers against unpredictable fluctuations of foreign exchange rates.

It is also desirable to offer a more flexible method for large entities to ensure against currency fluctuations.

It is further desirable to provide a method of foreign currency exchange rate protection through commonly accessible means such as credit cards or ATMs.

SUMMARY OF THE INVENTION

Accordingly, the present invention involves generating and executing insurance policies for foreign exchange losses that substantially obviate one or more of these limitations by automatically determining an appropriate premium, and processing transactions under the foreign exchange insurance policies.

Specifically, a method of providing a foreign exchange insurance policy consistent with this invention comprises a central controller receiving policy requirements from a user for the foreign exchange insurance policy; storing the policy requirements and the corresponding user ID; accessing data corresponding to the specified currency and current market conditions; estimating currency volatility from the accessed data; and computing a premium cost based on the currency volatility. The received policy requirements further include the specified currency, exchange rate, amount of coverage, and a period of coverage.

According to another aspect of the present invention, a system for providing a foreign exchange insurance policy consistent with this invention comprises receiving means, a database, accessing means, estimating means, and computing means. The receiving means receives policy requirements from a user for the foreign exchange insurance policy, including a user ID, a specified currency, exchange rate, amount of coverage, and a period of coverage. The database stores the policy requirements and the corresponding user ID. The accessing means access data including historic exchange rates corresponding to the specified currency and current market conditions. The estimating means estimates currency volatility from the accessed data. Finally, the computing means computes a premium cost based on the currency volatility.

BRIEF DESCRIPTION OF THE DRAWINGS

The accompanying drawings, which are incorporated in and constitute a part of this specification, illustrate the invention and together with the description, serve to explain the principles of the invention.

FIGS. 2A–2C are tables illustrating the data structure of the databases;

DETAILED DESCRIPTION

Reference will now be made in detail to the present preferred embodiments of the invention, examples of which are illustrated in the accompanying drawings.

System Architecture

Figure 1:
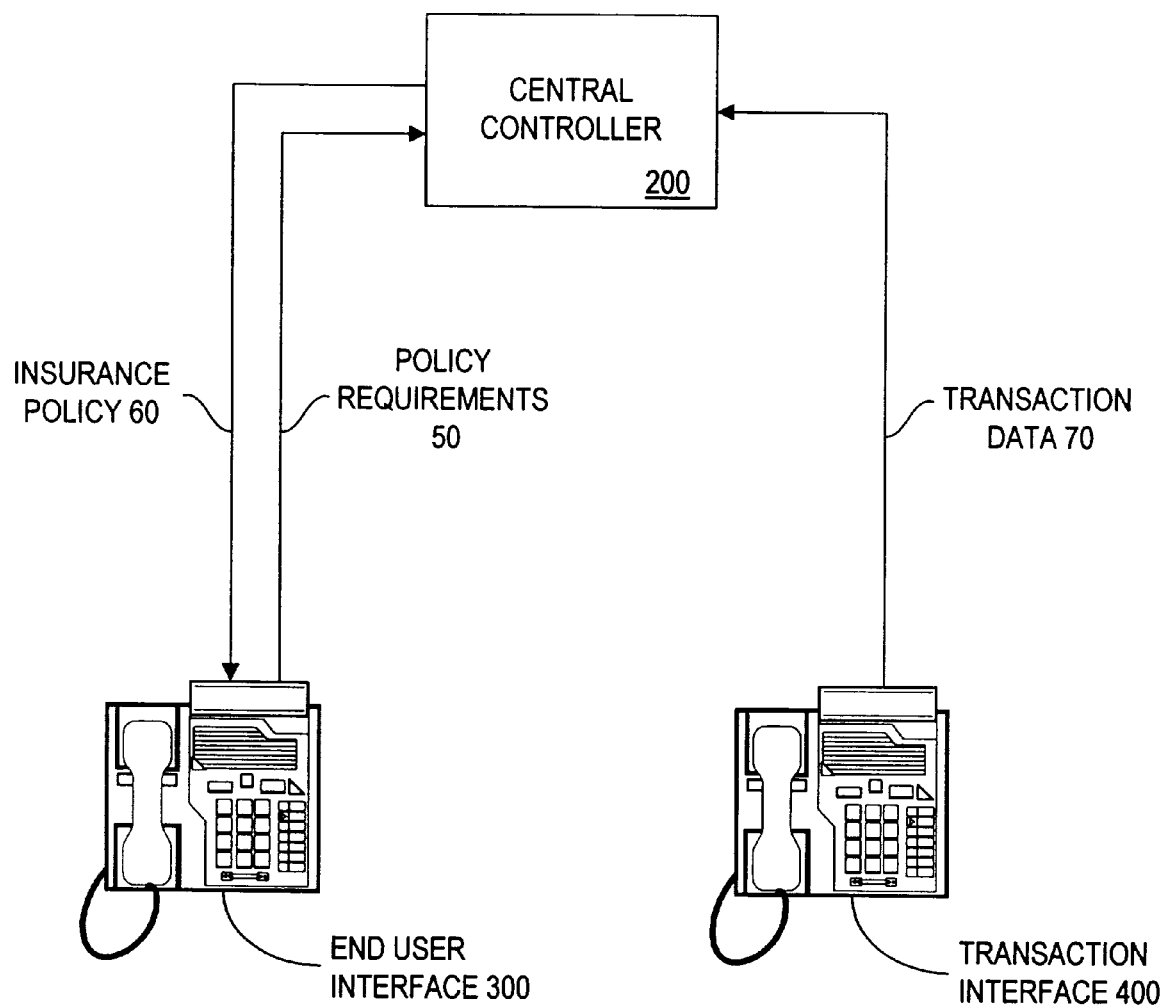
FIG. 1 is a block diagram of a system consistent with the present invention.

As shown in FIG. 1, a system consistent with the present invention includes a central controller 200, an end-user interface 300, and a transaction interface 400. The elements preferably connect to each other via a public switched telephone network. Alternatively, the system elements may be connected by dedicated data lines, cellular, Personal Communication Systems ("PCS"), microwave, satellite networks, Internet, or any other suitable form of data communications. Policy requirements 50, insurance policy 60, and transaction data 70 travel through these connections.

Figure 2:
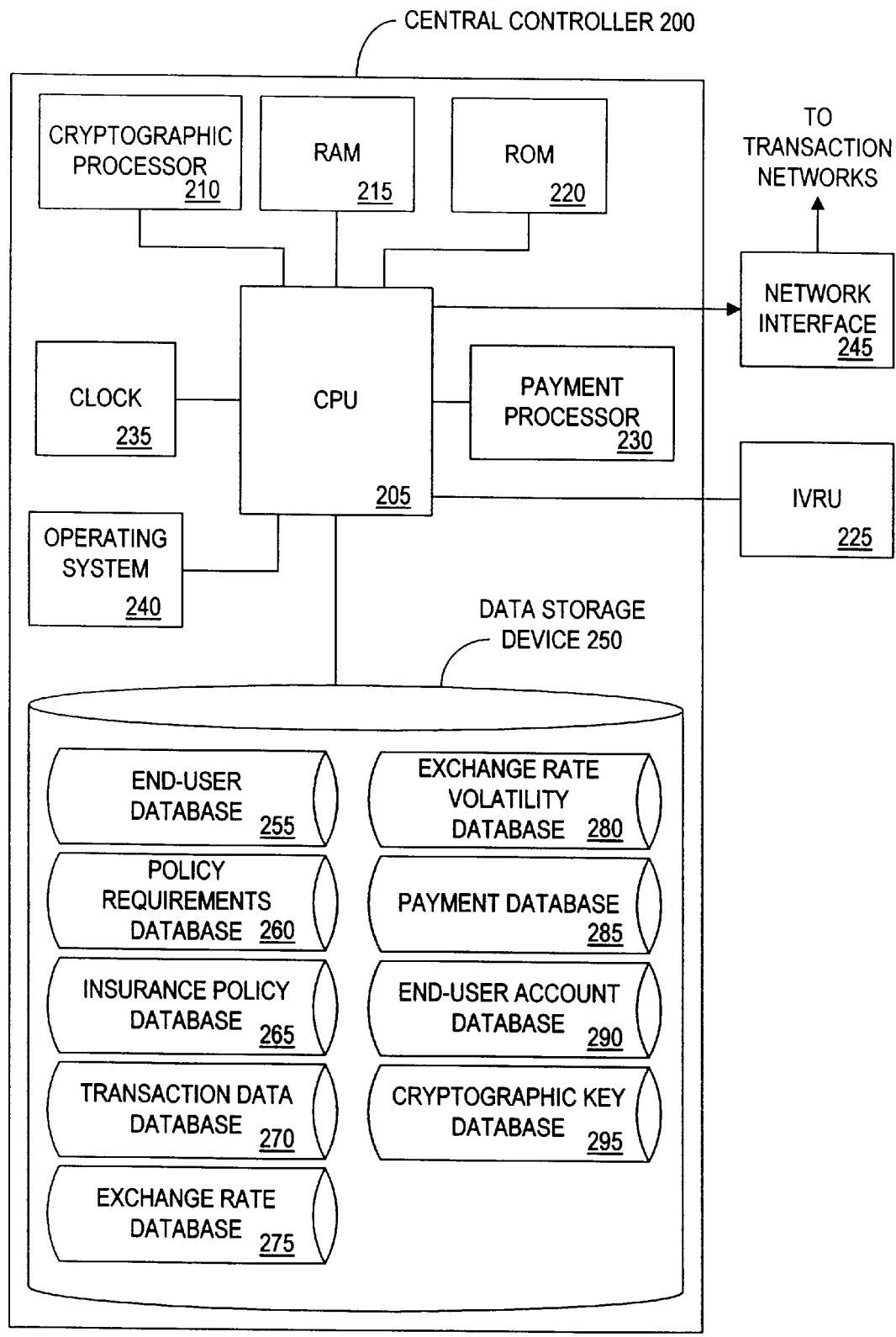
FIG. 2 is a detailed block diagram of the central controller in FIG. 1.

FIG. 2 shows a detailed block diagram of central controller 200 shown in FIG. 1. Central controller 200 preferably includes a central processor unit (CPU) 205, a cryptographic processor 210, a random access memory (RAM) 215, a read-only memory (ROM) 220, an Interactive Voice Response Unit (IVRU) 225, a payment processor 230, a clock 235, an operating system 240, a network interface 245, and a data storage device 250. All of these elements are connected to CPU 205 to facilitate communication between them.

Central controller 200 operates as a primary server, both receiving and transmitting communications with end-user interface 300 and transaction interface 400. Central controller 200 is preferably capable of high volume processing, performing a significant number of mathematical calculations in processing communications and database searches. Central controller 200 may be a conventional personal computer or a computer workstation with sufficient memory and processing capability. For example, a PENTIUM® microprocessor such as the 100 MHZ P54C microprocessor, commonly manufactured by Intel, Inc., may be used for CPU 205. This processor employs a 32-bit architecture. Equivalent processors include the 120 MHZ POWERPC 604 microprocessor, manufactured by Motorola, Inc. or the 166 MHZ ULTRASPARC-I microprocessor, manufactured by Sun Microsystems, Inc.

Cryptographic processor 210 supports the encoding and decoding of communications as well as the authentication of transactions. A MC68HC16 microcontroller, commonly manufactured by Motorola, Inc., may be used for cryptographic processor 210. This microcontroller uses a 16-bit multiply-and-accumulate instruction in a 16 MHZ configuration and requires less than one second to perform a 512-bit RSA private key operation. One skilled in the art may easily substitute other commercially available, specialized cryptographic processors such as the 33 MHZ 6868 processor, manufactured by VLSI Technology, Inc. or the 40 MHZ ROADRUNNER284 processor, manufactured by Semaphore Communications, Inc. Alternatively, cryptographic processor 210 may be configured as part of CPU 205.

Operating system 240 comprises a conventional operating system such as DOS or WINDOWS operating system software, manufactured by Microsoft Corporation or the OS2 operating system software, manufactured by International Business Machines, Inc.

Payment processor 230 supports the transfer and exchange of payments, charges, or debits. Exemplary services operable on payment processor 230 include on-line credit authorizations, credit card settlement, payments to transaction networks, and payment aggregation. Commercially available software, such as the SECURE WEB-SERVER software package manufactured by Open Market, Inc., may support credit card transaction processing of payment processor 230. This server software transmits credit card numbers electronically over the Internet to servers located at the headquarters of Open Market Inc., which handles card verification and processing. A service, such as INTEGRATED COMMERCE SERVICE feature offered by Open Market, Inc., provides back-office services necessary to run Web-based businesses. Payment processor 230 preferably comprises a microprocessor (such as the PENTIUM® microprocessor manufactured by Intel, Inc.), but alternatively may be configured as part of CPU 205.

Operating system 240 comprises a conventional operation system such as DOS or WINDOWS operating system software, manufactured by Microsoft Corporation or the OS2 operating system software, manufactured by International Business Machines, Inc.

Data storage device 250 may include a hard magnetic disk, optical storage units, CD-ROM drives, or flash memory. Data storage device 250 contains databases used in processing transactions in the present invention, including an end-user database 255, a policy requirements database 260, an insurance policy database 265, a transaction data database 270, an exchange rate database 275, an exchange rate volatility database 280, a payment database 285, an end-user account database 290, and cryptographic key database 295. In a preferred embodiment, database software such as Oracle7, manufactured by Oracle Corporation, creates and manages these databases.

End-user database 255 maintains data about end users and, in one embodiment, includes fields such as name, address, credit card number, phone number, ID number, social security number, electronic mail address, and public/private key information. This information is preferably obtained when the end user first generates insurance policy 60 on the system. End-user database 255 also contains the tracking number of each insurance policy 60 generated by the end user.

As shown in FIG. 2A, policy requirements database 260 maintains data on policy requirements generated by the end user, and preferably includes fields such as end-user ID, credit card number, currency selected, exchange rate, start date of coverage, end date of coverage, amount of coverage, and policy requirements tracking number.

As shown in FIG. 2B, insurance policy database 265 tracks each insurance policy 60 generated by end users, and preferably includes fields such as end-user ID number, insurance policy 60 tracking number, date generated, policy requirements tracking number, and status of premium payment. Each insurance policy 60 may have an associated status of insurance policy 60 such as "active," "pending," or "expired."

Figure 2C:

As shown in FIG. 2C, transaction data database 270 stores all transaction data relating to insurance policy 60. This database is indexed by the tracking number of insurance policy 60, and preferably contains fields such as end-user ID number, amount of transaction, date of transaction, prevailing exchange rate, and bank ID number.

Exchange rate database 275 facilitates the processing of transaction data 70 by storing current and historic exchange rates for every country. The current exchange rate may be updated hourly or continuously, but preferably automatically via financial networks transacting interbank foreign exchanges.

Exchange rate volatility database 280 stores historical volatility data corresponding to each currency. This data may include past exchange rates, as well as the standard deviation of the rates over a given period of time.

Payment database 285 tracks premium payments by end users, payments to merchants or banks, and payment of claims for insurance policy 60, which contains fields such as end-user name, end-user ID number, credit card number, amount of payments and date of payment. This database may also store the user's bank account information.

End-user account database 290 allows central controller 200 to track amounts owed to the end user under claims against insurance policy 60.

Finally, cryptographic key database 295 contains algorithms and keys for encrypting, decrypting, and authenticating communiations.

Network interface 245 provides the gateway to communication with transaction networks and financial data providers supplying current exchange rate information. Conventional internal or external modems may serve as network interface 245. Network interface 245 preferably supports modems at a range of baud rates from 1200 bps upward, but may combine such inputs into a T1 or T3 line if more bandwidth is required. In a preferred embodiment, network interface 245 is connected with the Internet or private data network.

IVRU 225 allows end users to communicate with central controller 200 via telephone. The user can therefore enter policy requirements 50 via touch-tone keys of the end user's telephone.

In another embodiment, central controller 200 is configured in a distributed architecture, wherein the databases and processors are housed in separate units or locations. Some controllers perform primary processing functions and contain at a minimum, a RAM, a ROM, and a general processor. Each of these controllers is attached to a wide-area network (WAN) hub that serves as a primary communication link with the other controllers and terminals. The WAN hub may have minimal processing capability itself, serving primarily as a communications router.

In an exemplary embodiment, end-user interface 300 is a conventional telephone, capable of communicating with central controller 200 via a public switched telephone network. Conventional cellular phones or PCS devices would work equally well.

Alternatively, end-user interface 300 includes a conventional personal computer having an input device, such as a keyboard, a mouse, or a conventional voice recognition software package; a display device, such as a video monitor; a processing device, such as a CPU; and a network interface, such as a modem. This configuration allows the end user to communicate with central controller 200 using any one of commercial on-line services such as the AMERICA ONLINE, COMPUSERVE, or PRODIGY services, allowing end user access to central controller 200 from a wide range of electronic connections.

Communications from end-user interface 300 are preferably software driven. Many commercial software applications, whose primary functions are message creation and transmission, can facilitate communications of end-user interface 300. The EUDORA PRO software application manufactured by Qualcomm Incorporated, for example, provides editing tools to create messages as well as communications tools to route messages to the appropriate electronic address. If central controller 200 is configured as a Web server, conventional communications software, such as NAVIGATOR® browser software from Netscape Corporation may also be used. The end user may use Navigator® browser to transmit policy requirements 50. Transaction interface 400 transmits transaction data 70 from the end user to central controller 200 for processing. The structure of transaction interface 400 depends on the type of transactions.

Figure 3:
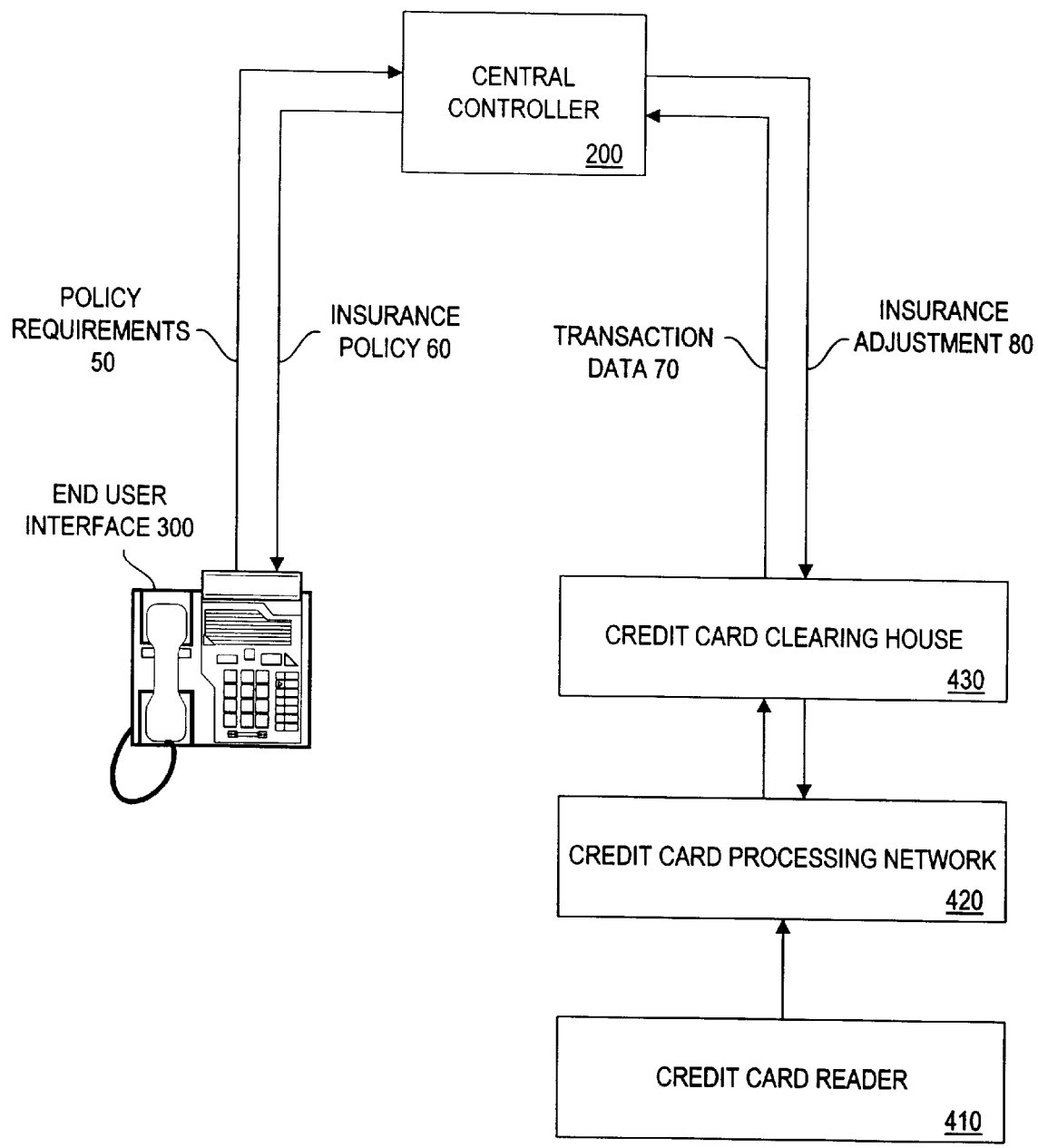
FIG. 3 is a block diagram of another system consistent with the present invention using credit cards.
Figure 4:
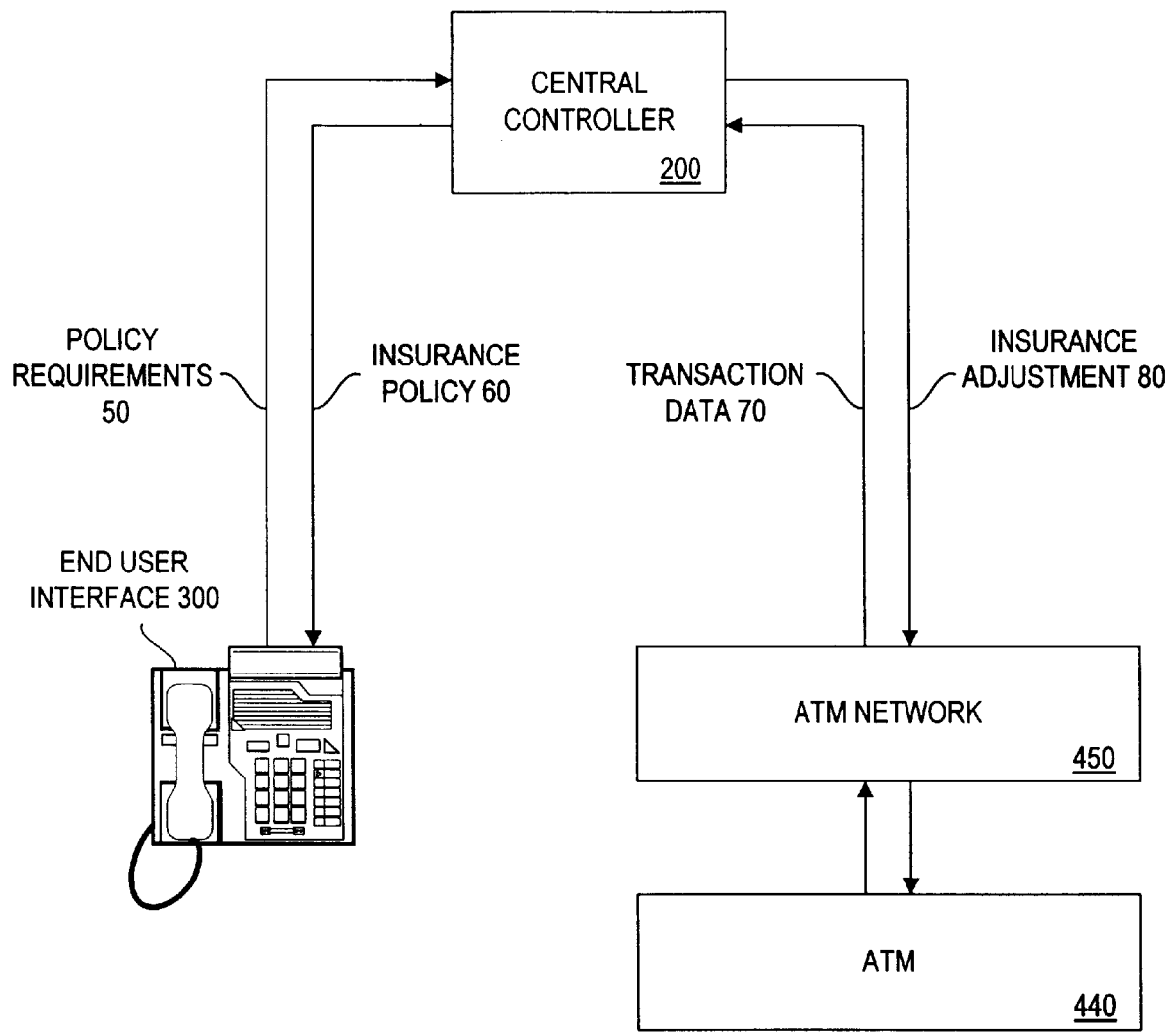
FIG. 4 is a block diagram of yet another system consistent with the present invention using automatic teller machines (ATMs)
Figure 5:
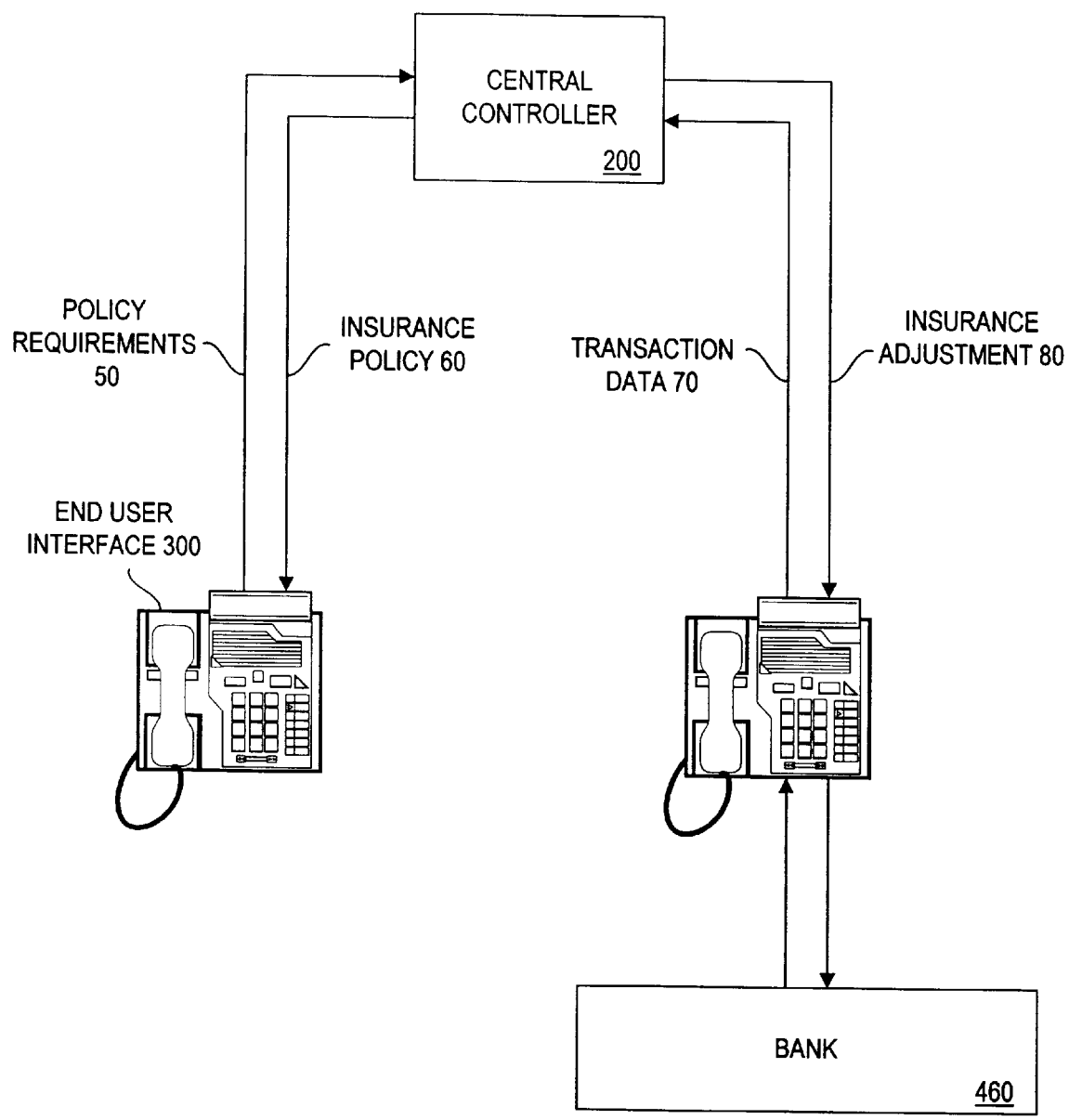
FIG. 5 is a block diagram of still another system consistent with the present invention using banks.

FIGS. 3–5 illustrate three different ways of further implementing the system in FIG. 1. FIG. 3 illustrates a credit card implementation of the present invention. Transaction data 70 flows from a credit card reader 410, to a credit card processing network 420, then to a credit card clearinghouse 430, and finally to central controller 200. These transactions are described in more detail below in connection with FIGS. 6–12.

FIG. 4 illustrates an automated teller machine (ATM) implementation of the present invention in which the end user withdraws money from an ATM. In this embodiment, the end user enters transaction data 70 into an ATM 440, which then transmits the data to an ATM network 450, and finally to central controller 200. This embodiment is described in more detail in connection with FIGS. 13–15.

FIG. 5 illustrates a bank implementation of the present invention in which the end user seeks to exchange currency at a bank or other financial institution. After providing transaction data 70 to a bank 460, bank 460 relays the information to central controller 200 using a conventional telephone or electronic network. This embodiment is described in more detail in connection with FIGS. 16 and 17.

Credit Card Implementation

In the credit card embodiment of the present invention shown in FIG. 3, policy requirements 50 and insurance policy 60 are transmitted over a phone line, while insured transactions occur through the use of a conventional credit card.

Figure 6:
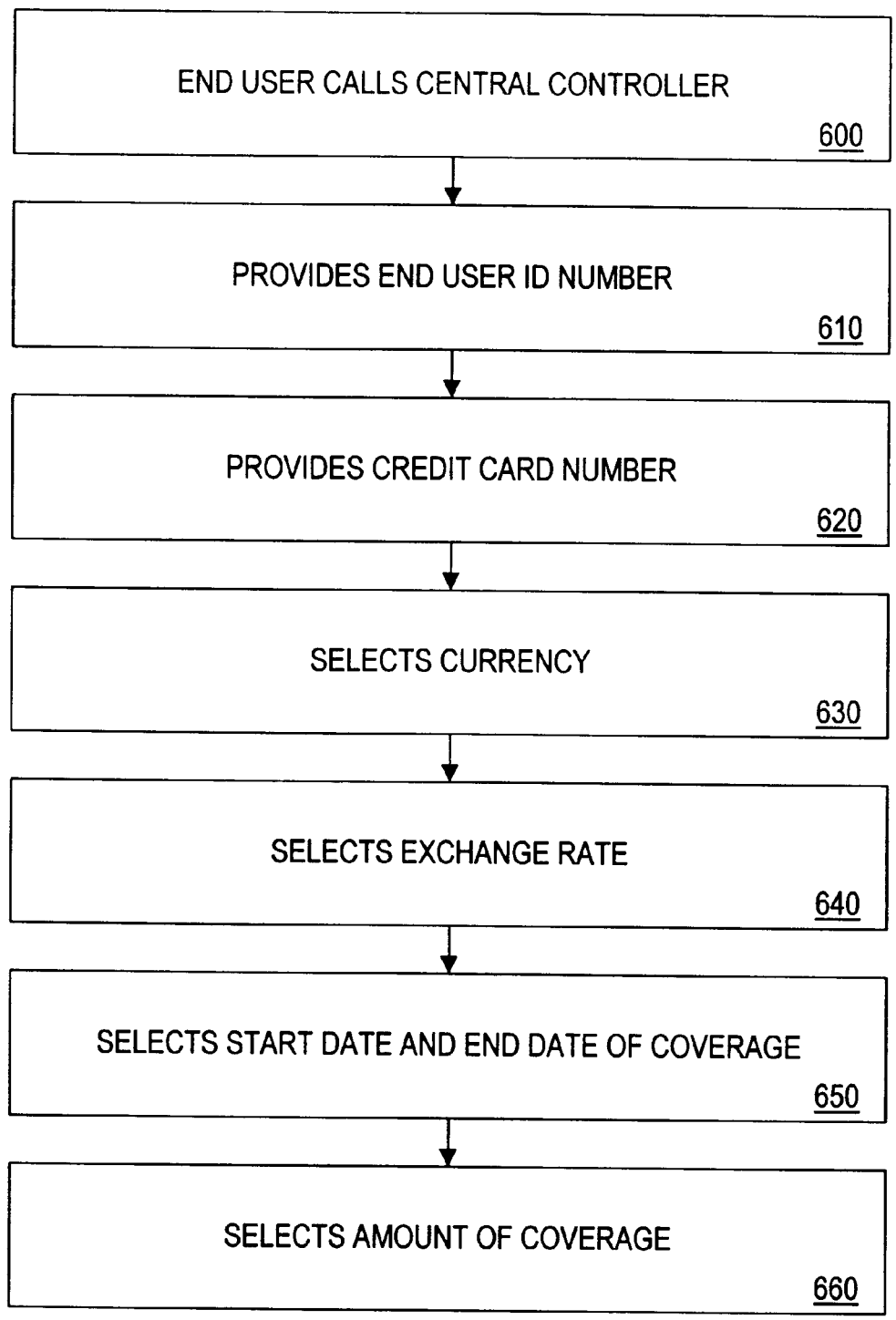
FIG. 6 is a flowchart illustrating a preferred process for selecting policy requirements.

FIG. 6 illustrates a preferred process for the end user to select policy requirements 50 (FIG. 1). Policy requirements 50 describe parameters for insurance policy 60, and reflect the insurance needs of the end user. Initially, the end user calls central controller 200 using a conventional telephone, establishing a communication link through a public switched telephone network (step 600). The end user may speak to an operator or enter the information into IVRU 225.

Central controller 200 processes information provided in steps 610 through 660 described below, as policy requirements 50. First, the end user provides his or her name or a unique ID number (step 610). Central controller 200 either receives this ID number from the end user, or assigns a number to the end user. Central controller 200 maintains a database of end-user ID numbers in end-user database 255, and assigns (or allows) only unique numbers. If minimal security is required, the user's telephone number may serve as the ID number since it is unique and easy to remember. If additional security is required, authentication procedures, described hereinafter in the cryptographic authentication section, may be implemented.

The end user provides a credit card number designated under insurance policy 60 (step 620), and then selects the foreign currency for insurance coverage, such as the French franc or German deutschemark (step 630). For alternative implementations, the credit card number of step 620 may be replaced with any other financial account numbers of the end user. For some currencies, additional information is necessary to indicate which of several exchange rates apply. In some countries, for example, the exchange rate is more favorable for local residents than for tourists.

The end user then selects the "locked-in" exchange rate (step 640). For example, if the current market rate for French francs is five per dollar, the end user may select five to one as his insured exchange rate. The end user may lock in any rate and the premium cost is computed accordingly. Insurance policy 60 will later compensate the end user for any transaction executed during a coverage period if the prevailing exchange rate at the time of transaction is less favorable than the locked-in exchange rate of five French francs per dollar. This protects the end user against an unfavorable fluctuation of the currency exchange rate.

Next, the end user selects start and end dates of coverage (step 650). These dates may correspond with personal or business travel dates of the end user. Transactions occurring either before the start date or after the end date are not covered by insurance policy. For example, policy requirement 50 of a business traveler on a two week trip may require a start date of Jul. 5, 1996 and an end date of Jul. 19, 1996. The end user also selects the desired amount of coverage, preferably in domestic currency (step 660).

In the above example, the end user selects two thousand dollars of coverage, ensuring protection for two thousand dollars' worth of transactions at the locked-in rate. Transactions may, for example, include credit card payments for hotels and restaurants. After spending francs equivalent of two thousand dollars at the locked-in rate, the end user is subject to the prevailing exchange rate and no longer enjoys the locked-in rate for future transactions.

Figure 7:
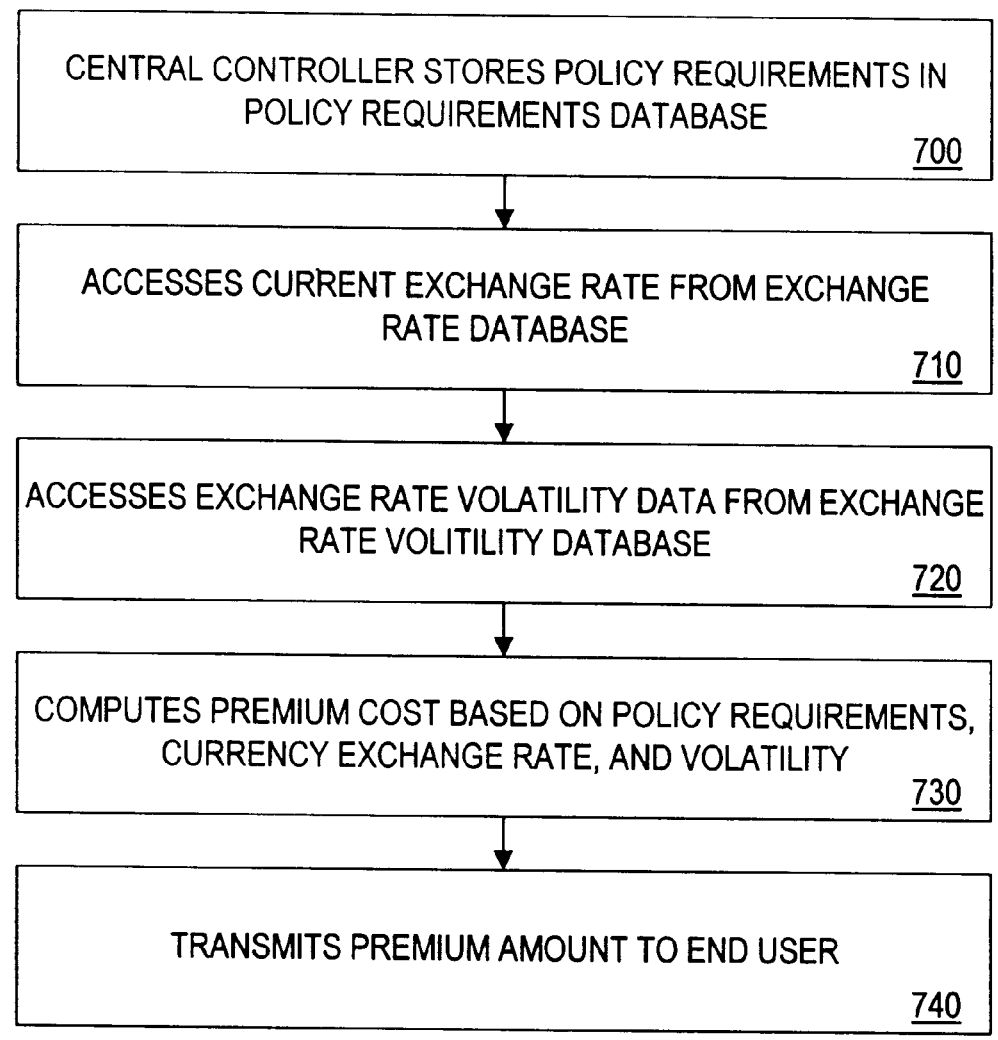
FIG. 7 is a flowchart illustrating a preferred process for calculating an insurance premium.

FIG. 7 is a flowchart illustrating a preferred process for calculating a premium cost. First, central controller 200 stores policy requirements 50 received from the end user, along with the end-user ID number, in policy requirements database 260 (step 700). CPU 205 accesses exchange rate database 275 for the current exchange rate of the currency designated in policy requirements 50 (step 710). This exchange rate is preferably the current interbank rate, which serves as the basis of most global foreign exchange transactions. CPU 205 then accesses exchange rate volatility database 280 for exchange rate volatility data (step 720). Currencies with large volatilities, expressed in terms of standard deviations over a fixed period of time, require a large premium cost due to a greater risk of exchange rate fluctuation.

A premium cost is calculated based on policy requirements 50, the current exchange rate, and exchange rate volatility data (step 730). Therefore, insurance for more volatile currencies requires higher premiums. Also, a coverage period having a start date far from the current date will also necessitate a higher premium as the effect of volatility is magnified over long periods of time. For example, policy requirements 50, indicating two days of coverage beginning five days from today, has a lower premium than the same policy beginning sixty days from now. Additionally, a longer coverage period requires a higher premium. The premium is also directly related to the amount of coverage. Policy requirements 50 specifying a locked-in rate that is below current spot exchange rates, however, lowers premium cost because a greater amount of fluctuation may occur before the coverage begins to take effect, thus, reducing the risk to the policy provider. Therefore, the premium cost is a function of policy requirements 50, current exchange rate, and exchange rate volatility. Once calculated, the premium cost is transmitted to the end user (step 740).

Figure 8:
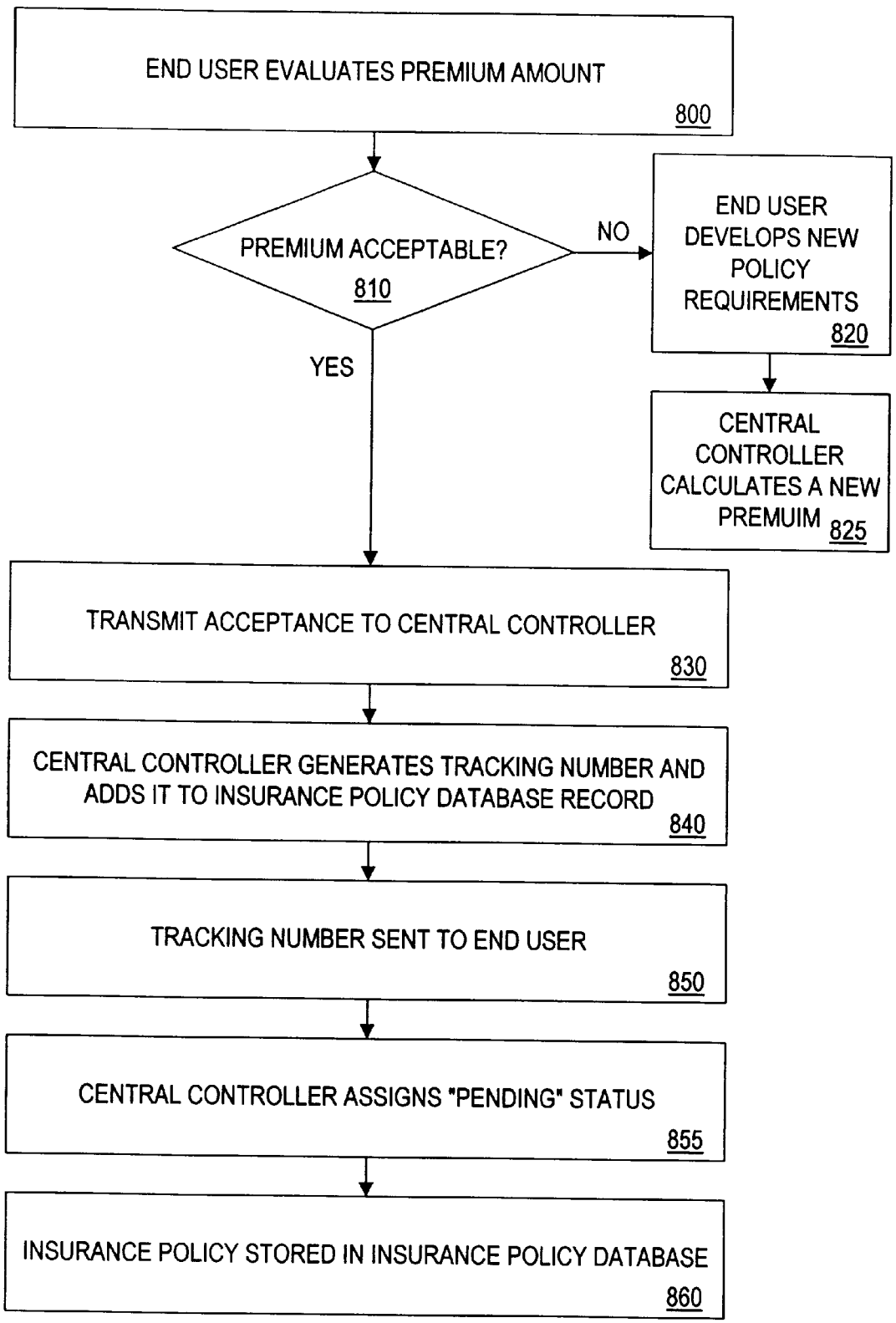
FIG. 8 is a flowchart illustrating a preferred process for creating the insurance premium for the user.

FIG. 8 is a flowchart illustrating a preferred process for creating insurance policy 60. The end user evaluates the premium cost transmitted by central controller 200 to decide whether the premium is acceptable (step 800). If the premium is not acceptable to the end user, the end user may develop new policy requirements 50 (step 820). For example, if the premium is too high, the user may lower the amount of coverage or change the period of coverage. Central controller 200 then calculates a new premium based on the modified policy requirements 50 (step 825), as described in connection with FIG. 7.

If the premium is acceptable to the end user (step 810), the user transmits an acceptance to central controller 200, providing confirmation over the phone or other communication channels such as electronic mail, postal mail, or pager (step 830). To bill the user for the premium, central controller 200 may directly debit the user's credit card account or send a separate bill to the user. Next, central controller 200 generates a tracking number and appends it to insurance policy 60 (step 840), and transmits this tracking number to the end user as a confirmation of insurance policy 60 (step 850). If the user desires, central controller 200 also transmits the details of insurance policy 60 to the end user.

At this point, central controller 200 assigns a "pending" status to the newly created insurance policy 60 (step 855). Central controller 200 stores insurance policy 60 in insurance policy database 265 along with its corresponding status (step 860). Later, if the end user satisfies a credit approval process or pays the premium, central controller 200 changes the "pending" status of insurance policy 60 to an "active" status.

Figure 9:
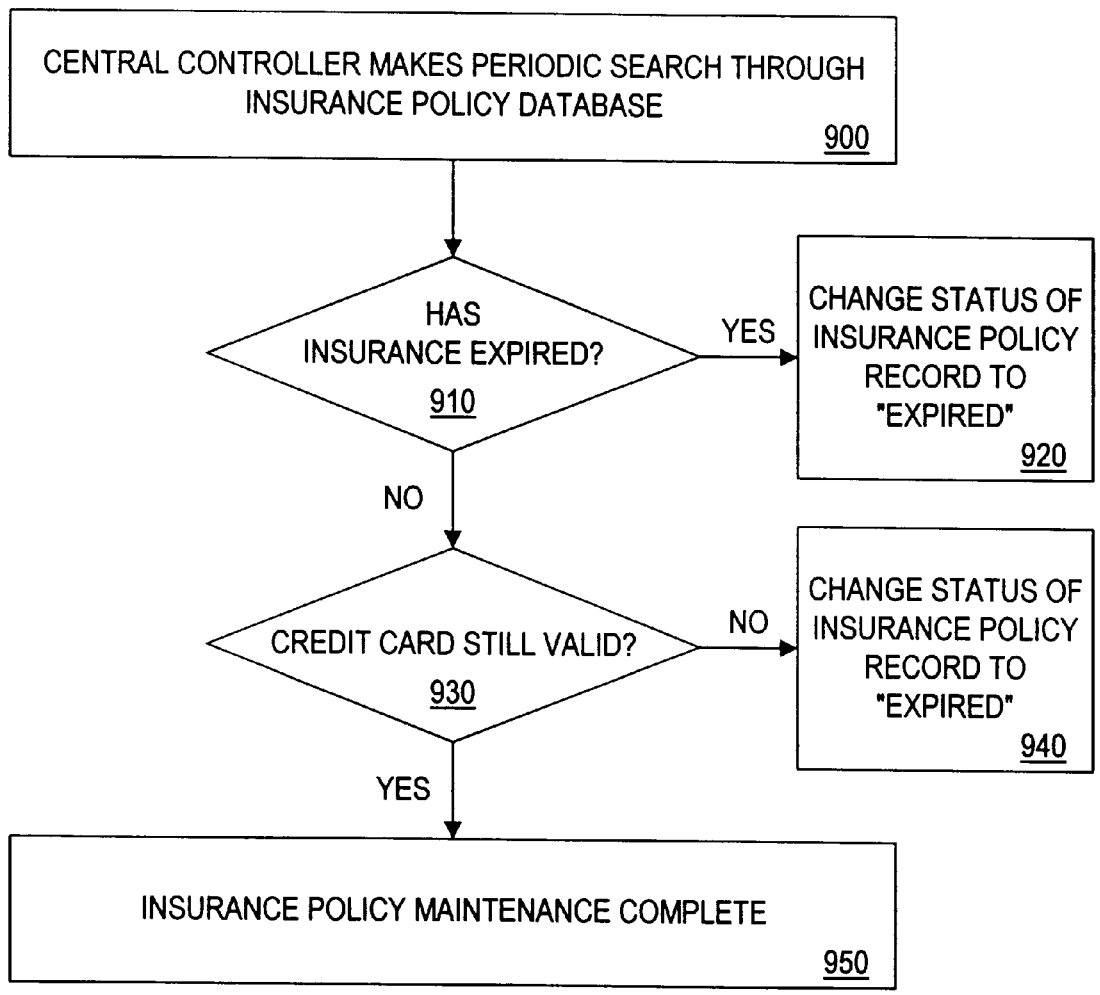
FIG. 9 is a flowchart illustrating a preferred process for system maintenance of active insurance policies.

Central controller 200 also performs maintenance checks to ensure that only active insurance policy 60 is stored in insurance policy database 265. FIG. 9 is a flowchart illustrating a preferred process for maintaining active insurance policy 60 (FIG. 1). First, central controller 200 makes periodic searches through insurance policy database 265, retrieving the end date of each insurance policy 60 as well as the credit card number (step 900). CPU 205 compares the end date of policy 60 with the current date (step 910).

If the current date is later than the end date of insurance policy 60, central controller 200 changes the status of insurance policy 60 to "expired" (step 920). Database records for "expired" insurance policies 60 may be deleted from insurance policy database 265 once all claims have been settled with the end user or stored in an audit database for subsequent reference. If the insurance policy 60 has not expired, payment processor 230 checks to see whether the credit card number is still valid by contacting a credit card clearinghouse (step 930). If the card number is no longer valid, the status of insurance policy 60 is changed to "expired" (step 940). Otherwise, insurance policy 60 maintenance process is complete (step 950).

Figure 10:
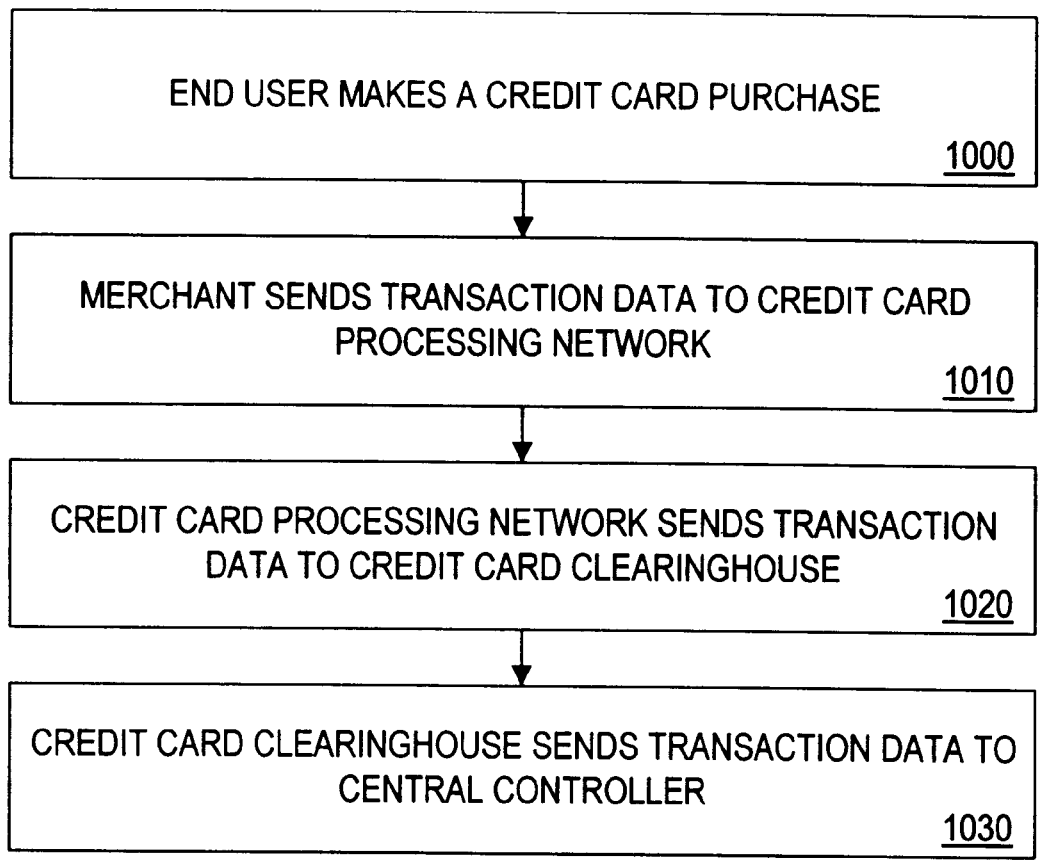
FIG. 10 is a flowchart illustrating a preferred process for transmitting transaction data using credit cards.

Once an active insurance policy 60 is stored in insurance policy database 265, the end user may execute transactions under insurance policy 60. FIG. 10 is a flowchart illustrating a preferred process for generating transaction data 70 (FIG. 3). As the end user executes foreign currency transactions with the credit card, the data is transmitted to central controller 200 for processing. First, the end user makes a credit card purchase with the credit card designated in insurance policy 60 (step 1000). For example, the end user buys a bottle of wine in France, providing the merchant the credit card data. The merchant sends transaction data 70, which is the credit card data and the purchase amount, to credit card processing network 420 (step 1010).

The merchant may swipe the credit card through credit card reader 410 to extract credit card information from the magnetic strip on the back of the card, or use some equivalent resource. The merchant then enters the amount of the transaction into a numeric keypad of credit card reader 410. Credit card reader 410, connected to credit card processing network 420 over a dedicated communication line, electronically transmits transaction data 70, and sends transaction data 70 to credit card clearinghouse 430 (step 1020). Credit card clearinghouse 430, operated by the member banks, functions as a consolidator of credit card transactions, and sends transaction data 70 to central controller 200 in real time or in a batch process (step 1030).

Figure 11:
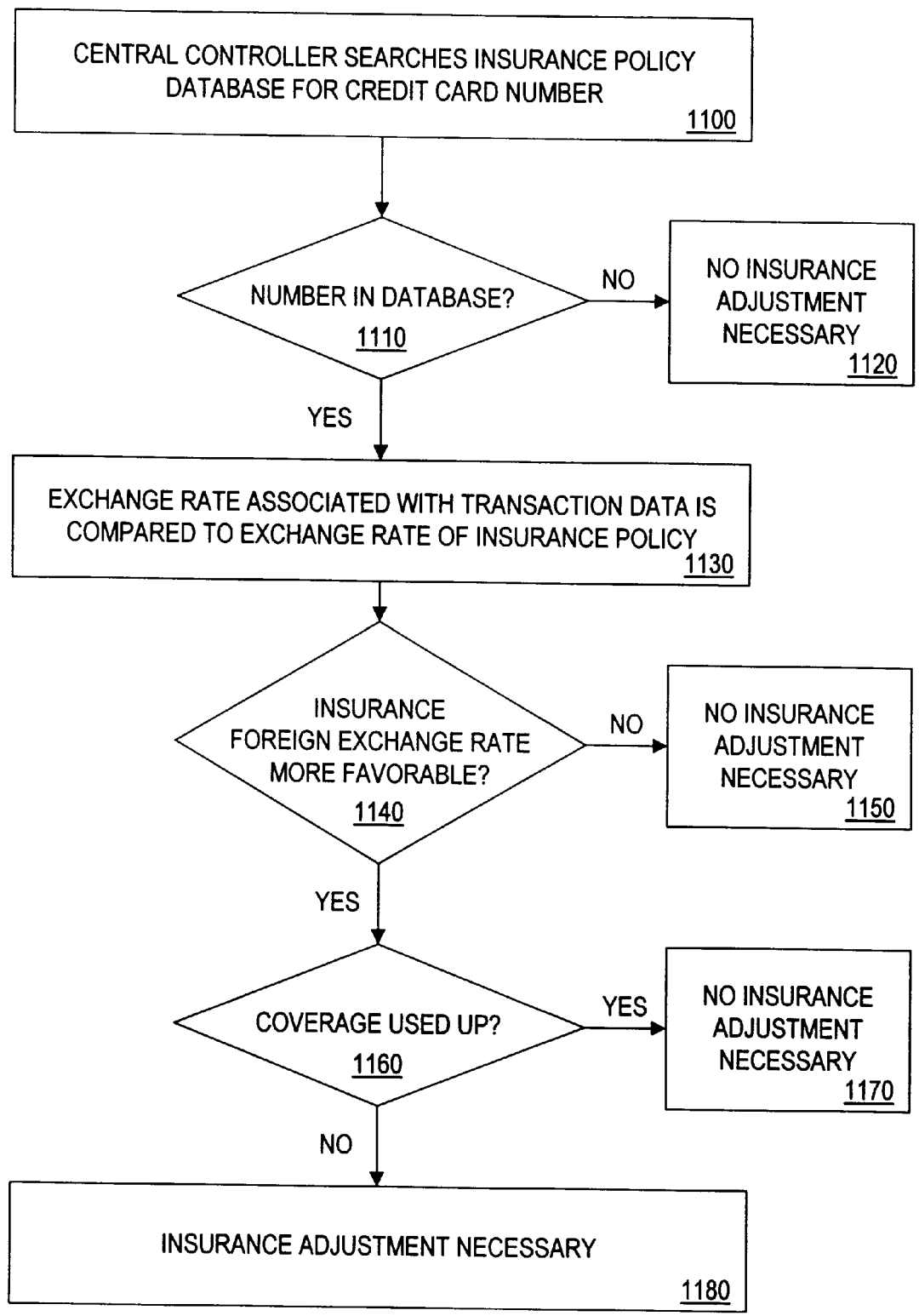
FIG. 11 is a flowchart illustrating a preferred process for determining whether an insurance adjustment is necessary for the process of FIG. 10.

After central controller 200 receives transaction data 70, it processes transaction data 70 under insurance policy 60. FIG. 11 is a flowchart illustrating a preferred process for determining whether an insurance adjustment 80 (FIG. 3) is necessary. First, central controller 200 searches insurance policy database 265 for the credit card number associated with each transaction data 70 received from credit card clearinghouse 430 (step 1100). If the credit card number is not found in insurance policy database 265 (step 1110), no insurance adjustment 80 is necessary because the end user does not have an active policy (step 1120).

If the credit card number is found in insurance policy database 265, the exchange rate associated with transaction data 70 is compared with the locked-in rate specified in insurance policy 60 (step 1130). The exchange rate associated with transaction data 70 is the prevailing spot exchange rate at the time of the transaction. This prevailing exchange rate is retrieved from exchange rate database 270. CPU 205 calculates whether the locked-in rate is more favorable than the prevailing rate on the day of transaction (step 1140). For example, if the locked-in rate is five francs per dollar and the prevailing spot rate on the day of the transaction is six francs per dollar, then the prevailing rate is more favorable. If the prevailing rate is more favorable than the locked-in rate, insurance adjustment 80 is not necessary (step 1150).

If the rate received by the end user is less favorable than the locked-in rate, CPU 205 checks insurance policy database 265 to determine whether the coverage amount has already been used up (step 1160). If the coverage has been used up, insurance adjustment 80 is not necessary (step 1170). For example, insurance policy 60 with a two thousand dollar coverage does not cover insurance adjustment 80 for any transaction beyond the two thousand dollars. If the coverage is not exhausted, insurance adjustment 80 is necessary (step 1180).

Figure 12:
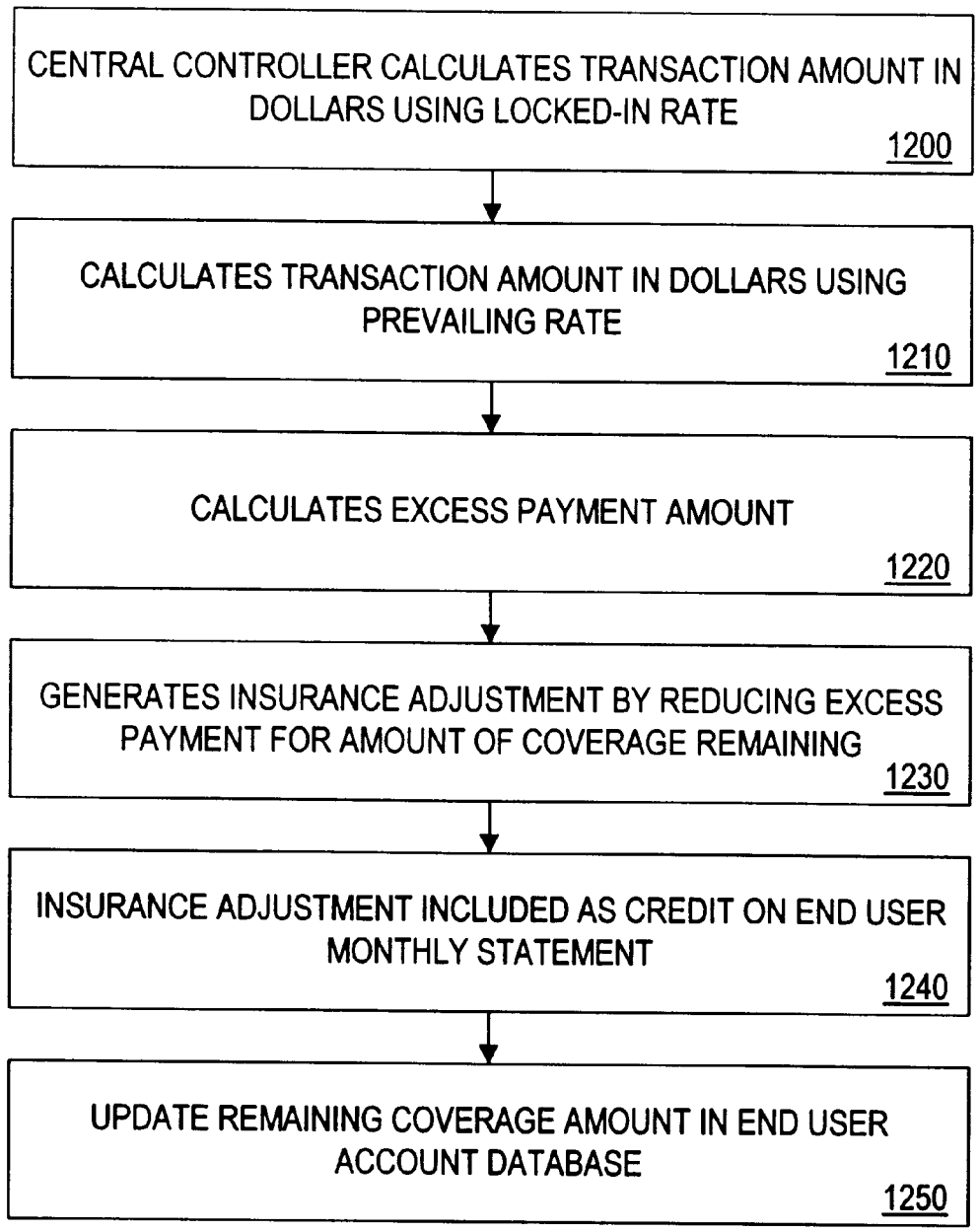
FIG. 12 is a flowchart illustrating a preferred process for calculating the amount of the insurance adjustment.

FIG. 12 is a flowchart illustrating a preferred process for calculating the amount of insurance adjustment 80. First, central controller 200 calculates the amount of the transaction in domestic currency using the locked-in exchange rate (step 1200). For example, a traveler paying one thousand francs for a hotel room with a locked-in exchange rate of five francs per dollar would have a transaction amount of two hundred dollars.

Next, central controller 200 calculates the transaction amount in domestic currency using the prevailing exchange rate on the day transaction data 70 is received by central controller 200 (step 1210). For example, if the prevailing exchange rate is four francs per dollar when the traveler pays for his hotel room, the cost in dollars would be two hundred and fifty. The differential between the two amounts is determined by subtracting the transaction amount at the prevailing rate from the transaction amount at the locked-in rate (step 1220). In the above example, the differential is fifty dollars. This represents a loss to the traveler due to the drop in exchange rate from five francs to four francs per dollar.

Finally, insurance adjustment 80 is determined by computing the differential corresponding to the remaining amount of coverage under insurance policy 60. For example, if the traveler has only one hundred dollars of coverage remaining, the differential of fifty dollars is halved to reflect that only half of the two hundred dollar purchase transaction is covered, and the end user is only entitled to insurance adjustment 80 of twenty-five dollars. If the end user has a remaining coverage greater than the purchase amount at the locked-in rate, then insurance adjustment 80 is equal to the computed differential. Insurance adjustment 80 is transmitted to the issuing bank of the credit card (step 1230), or stored in end-user account database 290 for later processing until the coverage of insurance policy 60 expires or is used up. Insurance adjustment 80 appears as a credit on the monthly credit card statement of the end user (step 1240). Central controller 200 also updates the remaining amount of coverage in end-user account database 290 (step 1250).

ATM Implementation

The end user can also enjoy a locked-in exchange rate for cash withdrawals from ATMs abroad. The procedure establishing insurance policy 60 is identical to that described above in connection with FIGS. 6–8.

Figure 13:
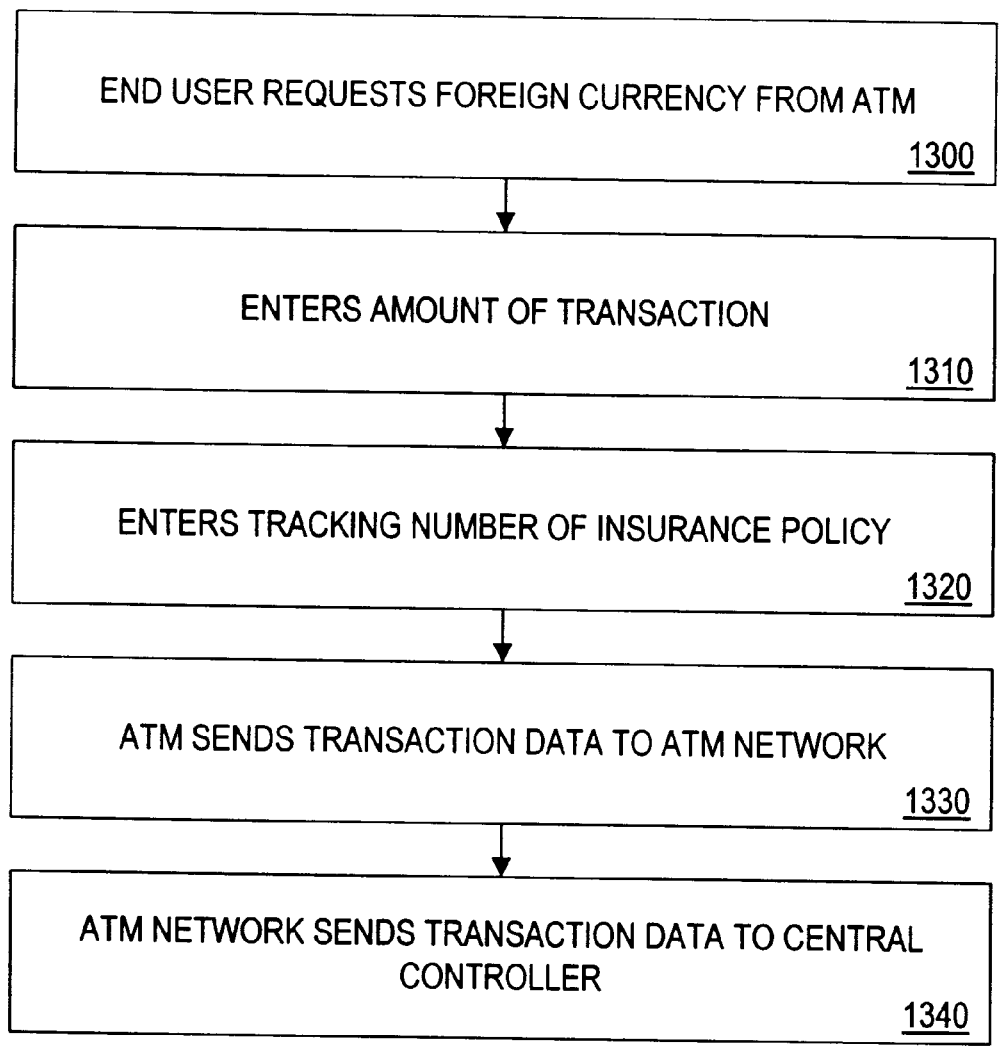
FIG. 13 is a flowchart illustrating a preferred process for transmitting transaction data using ATMs.

FIG. 13 is a flowchart illustrating a preferred process for generating transaction data 70 when the end user withdraws money from an ATM. The end user requests foreign currency from ATM 440 (step 1300). Using the numeric keypad of ATM 440, the end user enters the amount of the transaction (step 1310). A traveler in France, for example, withdraws one thousand francs from ATM 440. If the user wants to use the locked-in rate of insurance policy 60, the traveler enters the tracking number of insurance policy 60 into ATM 440 (step 1320). In addition to the amount of withdrawal and tracking number, transaction data 70 includes, for example, the end user's PIN number, the current date, and an ATM identification number. ATM 440 sends transaction data 70 to ATM network 450 using the dedicated communication line of ATM 440 (step 1330). ATM network 450 relays transaction data 70 to central controller 200 for processing, waiting for a transmission from central controller 200 to provide the appropriate exchange rate (step 1340).

To obtain the appropriate exchange rate, central controller 200 determines whether an insurance adjustment is necessary when the end user withdraws money from an ATM.

Figure 14:
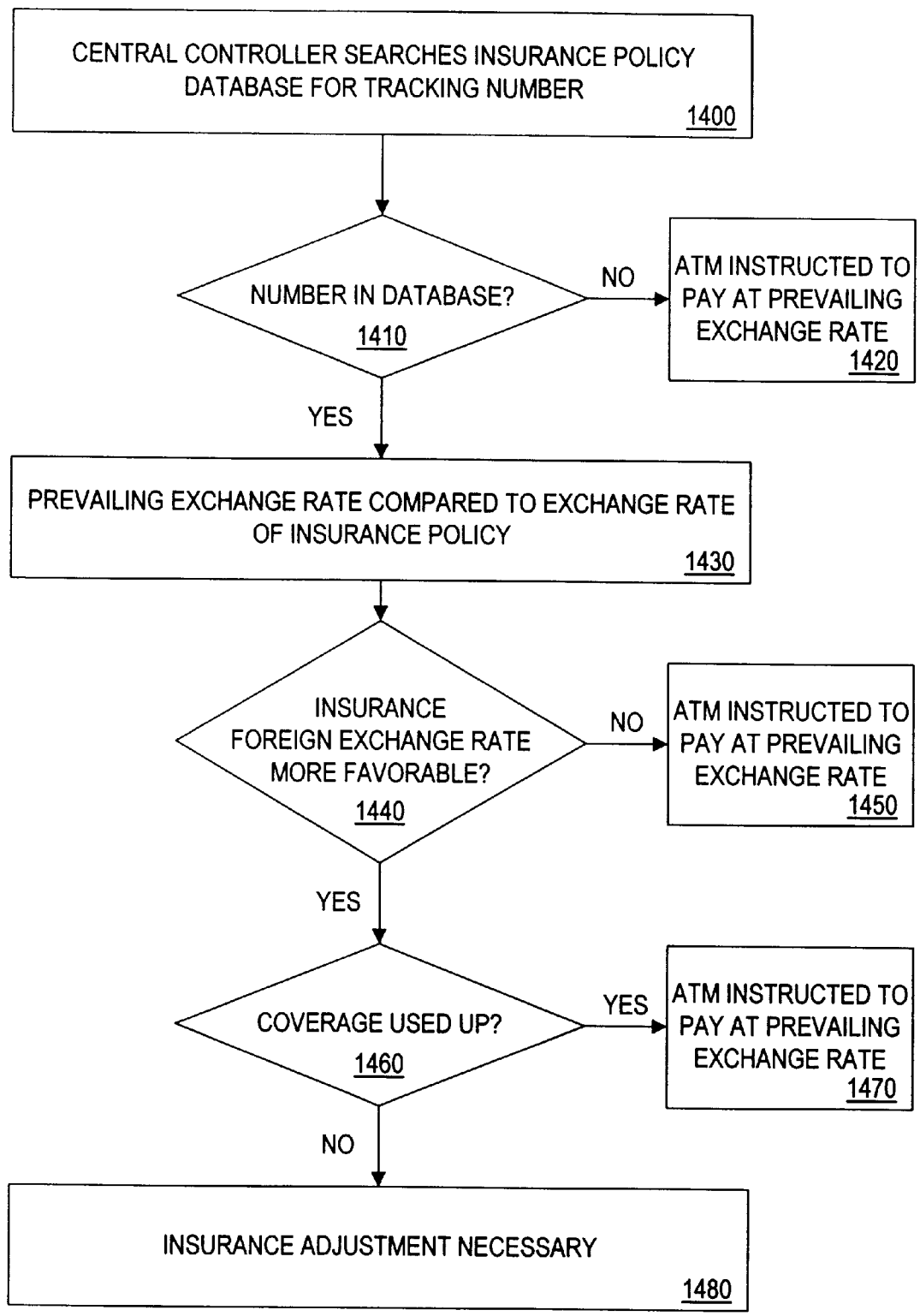
FIG. 14 is a flowchart illustrating a preferred process for determining whether an insurance adjustment is necessary for the process of FIG. 13.

Referring to FIG. 14, central controller 200 searches insurance policy database 265 for the tracking number received from ATM network 450 (step 1400). If central controller 200 does not find the tracking number in insurance policy database 265 (step 1410), central controller 200 transmits a message to ATM network 450, instructing ATM 440 to issue the cash at the prevailing rate (step 1420).

If the tracking number is found, central controller 200 compares the prevailing exchange rate to the locked-in exchange rate of insurance policy 60 (step 1430). If the exchange rate specified in insurance policy 60 is not more favorable than the prevailing rate (step 1440), ATM 440 is instructed (through ATM network 450) to pay the end user at the prevailing exchange rate (step 1450). This prevents the end user from invoking a claim under insurance policy 60 if the prevailing exchange rate is less favorable or equal to the prevailing rate.

If the locked-in exchange rate is more favorable than the prevailing rate, however, central controller 200 accesses end-user account database 290 to check the remaining coverage amount (step 1460). If the coverage has been exhausted, ATM 440 is once again instructed to pay the end user at the prevailing exchange rate (step 1470). If coverage remains, however, central controller 200 determines that insurance adjustment 80 is necessary (step 1480).

Figure 15:
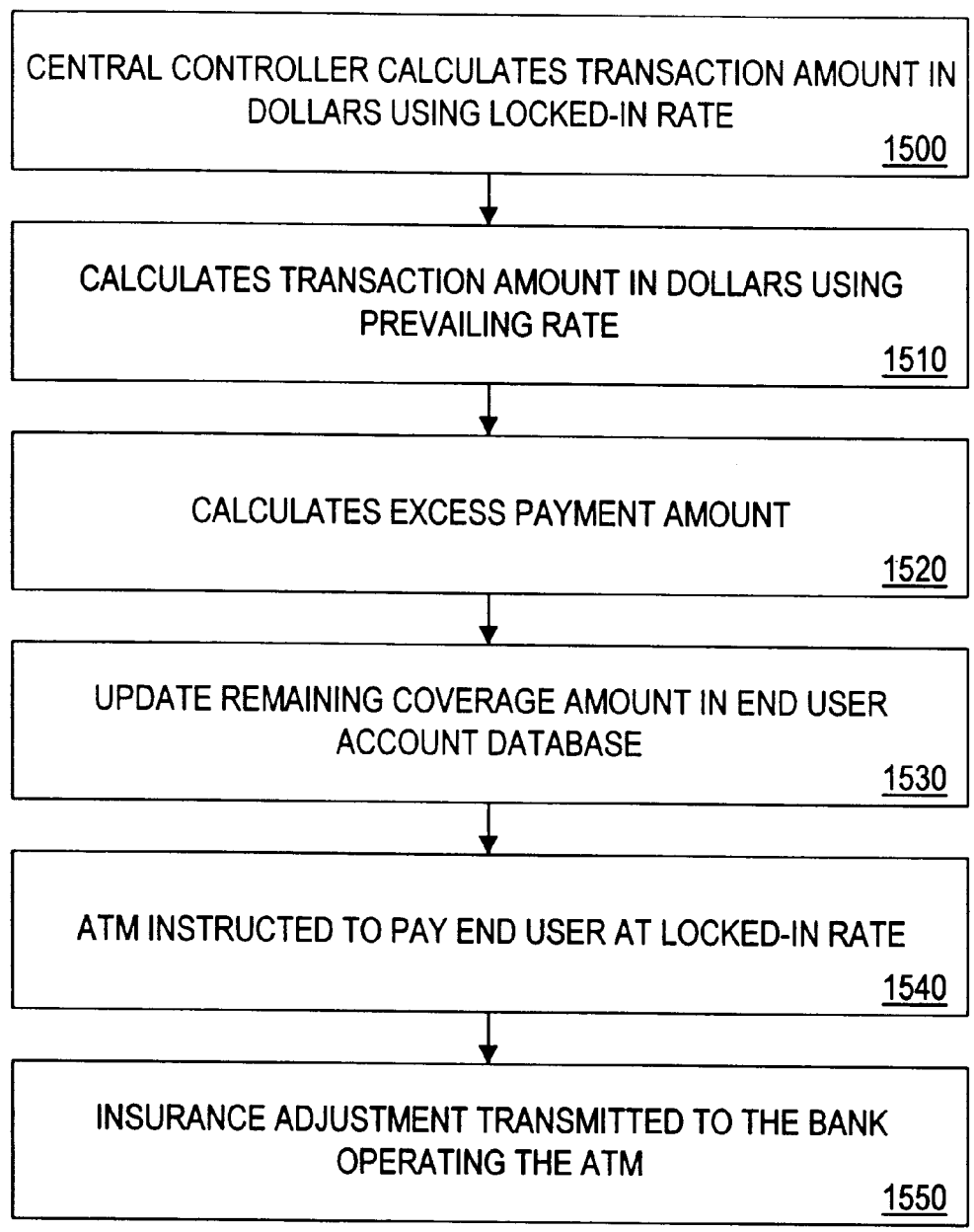
FIG. 15 is a flowchart illustrating a preferred process for calculating the amount of the insurance adjustment for the process of FIG. 13.

After central controller 200 determines that insurance adjustment 80 is necessary, it calculates the amount of insurance adjustment 80 as shown in FIG. 15. First, central controller 200 determines the remaining amount of coverage (step 1500). Central controller 200 then calculates the foreign exchange differential. In doing so, central controller 200 calculates the amount to be withdrawn in dollars at the locked-in rate (step 1510). The amount of withdrawal is also calculated in dollars using the prevailing rate at the time of the withdrawal. Central controller 200 obtains the amount of insurance adjustment 80 as described above in connection with FIG. 14 (step 1520), and updates the remaining amount of coverage in end-user account database 290 (step 1530).

Central controller 200 instructs ATM 440 to present the end user with currencies at the locked-in exchange rate of insurance policy 60 (step 1540). In order to compensate the bank operating ATM 440 for the exchange rate loss associated with the transaction, central controller 200 electronically transfers the amount of currency equal to insurance adjustment 80 to the bank (step 1550).

In an alternative embodiment, the end user's bank transmits the electronic compensation to the bank operating ATM 440. Central controller 200 later reimburses the end user's bank for the amount of insurance adjustment 80.

Bank Implementation

In another embodiment of the present invention, the end user enjoys a locked-in exchange rate for currency exchanges at a bank. The procedure establishing insurance policy 60 is described above in connection with FIGS. 6–8.

Figure 16:
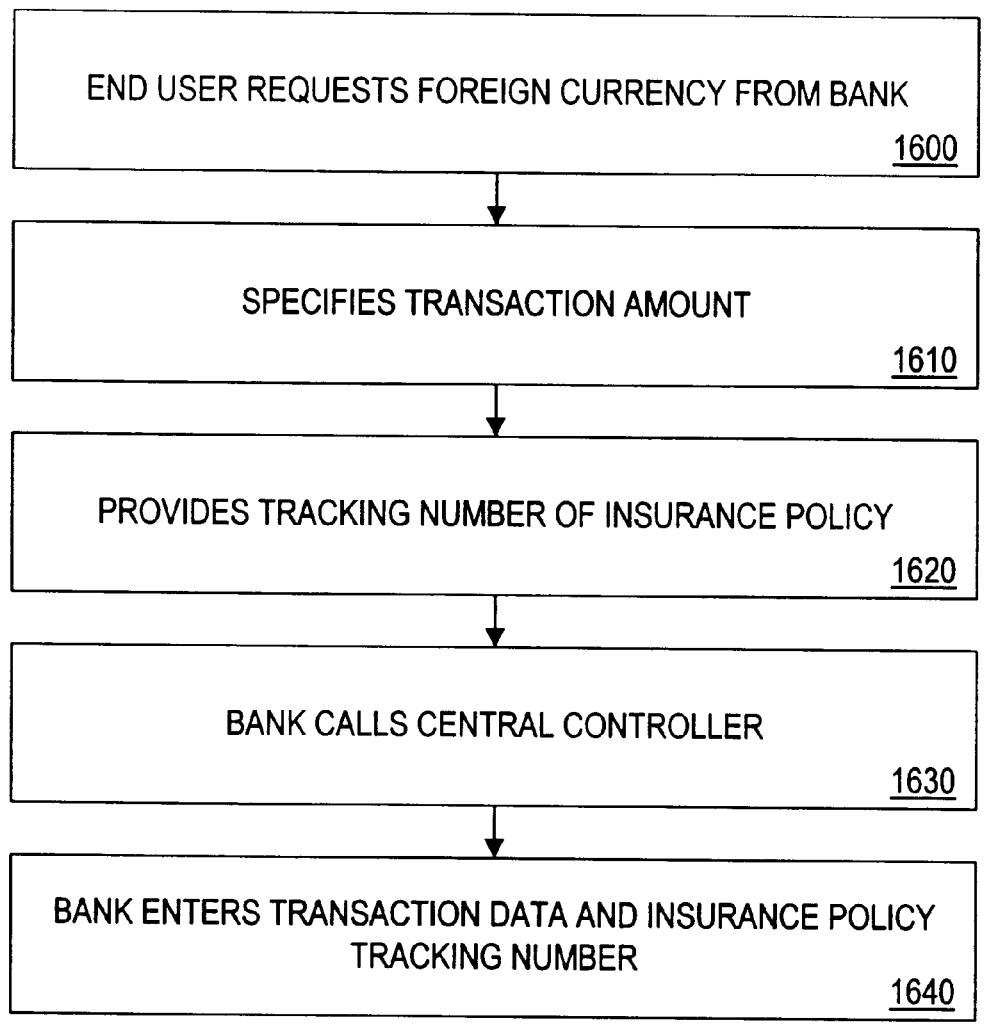
FIG. 16 is a flowchart illustrating a preferred process for transmitting transaction data using banks.

FIG. 16 is a flowchart illustrating a preferred process for generating transaction data 70 by the end user exchanging money at a bank. The end user requests currency exchange at a foreign bank (step 1600), and specifies the amount of transaction (step 1610). For example, a tourist may exchange two hundred dollars into francs.

The end user then provides the tracking number of insurance policy 60 (step 1620), enabling bank 460 to verify the exchange rate that the end user demands. Next, bank 460 calls central controller 200 using a conventional telephone (step 1630), and provides transaction data 70 such as end user name, insurance policy 60 tracking number, amount of currency to be exchanged, current exchange rate, and a bank identification number. Bank 460 enters transaction data 70 using a touch-tone telephone or by speaking with an agent (step 1640).

Figure 17:
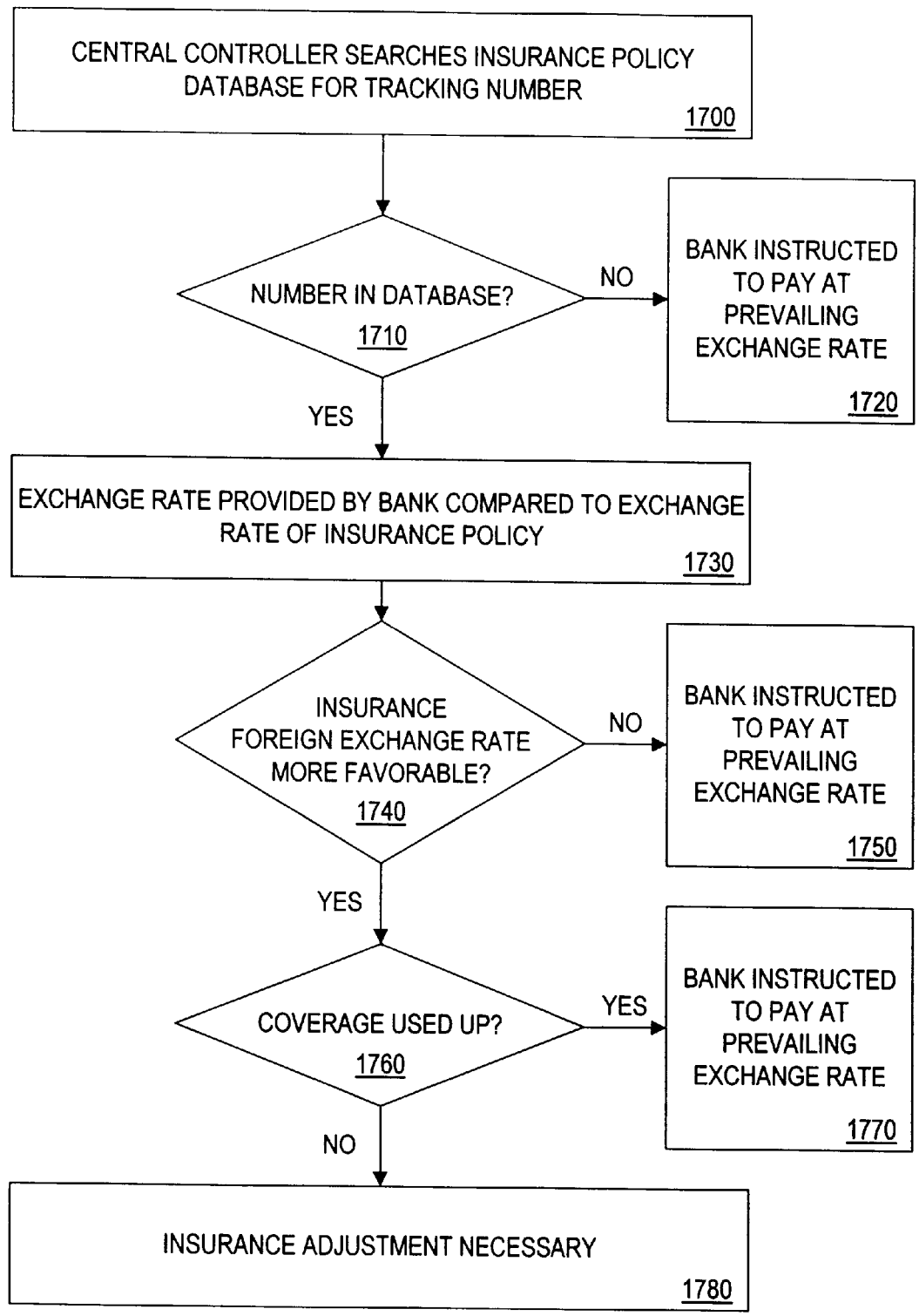
FIG. 17 is a flowchart illustrating a preferred process for determining whether an insurance adjustment is necessary for the process of FIG. 16.

FIG. 17 is a flowchart illustrating a preferred process for determining whether insurance adjustment 80 is necessary. Central controller 200 processes transaction data 70. Central controller 200 searches insurance policy database 265 for the tracking number transmitted by bank 460 (step 1700). If central controller 200 does not find the tracking number in insurance policy database 265 (step 1710), central controller 200 instructs bank 460 to exchange the end user's money at the prevailing exchange rate (step 1720). If the tracking number is found, then the exchange rate provided by bank 460 is compared to the locked-in exchange rate specified in insurance policy 60 (step 1730). If the locked-in rate is not more favorable (step 1740), then central controller 200 instructs bank 460 to exchange the end user's money at the prevailing exchange rate (step 1750). If the locked-in rate is more favorable, central controller 200 checks the remaining amount of coverage (step 1760). If no coverage remains, central controller 200 instructs bank 460 to exchange the end user's money at the prevailing exchange rate (step 1770). If the coverage is not exhausted, however, insurance adjustment 80 is required (step 1780). Central controller 200 then calculates the amount of insurance adjustment 80 as described above in connection with FIG. 15, and updates the remaining coverage amount in end user account 240.

Offline Implementation

All the implementations described above use transaction data 70 transmitted to central controller 200 over electronic networks. The present invention, however, may also employ off-line methods for submitting transaction data 70.

For example, a business traveler on a two week trip in Germany could collect receipts for all of his transactions. Upon returning from the trip, the traveler may mail these receipts to a person who enters the data into central controller 200, which then processes the transaction as described above. Any insurance adjustment 80 required may be mailed to the end user.

Internet Implementation

Creation of insurance policy 60 and processing of transaction data 70 can also take place over an electronic network such as the Internet or a commercial online service provider like the AMERICA ONLINE or COMPUSERVE services. The end user logs on to central controller 200 using a personal computer as end-user interface 300. The procedure establishing insurance policy 60 is similar to that described above in connection with FIGS. 6–8. The end user is then able to provide the tracking number as proof of insurance for any electronic commerce conducted on the Internet.

For example, the end user accesses a Web site and purchases tickets (denominated in French francs) for an opera in France. The end user provides the credit card number and the tracking number, and the Web site verifies insurance policy 60 with central controller 200. Once verified, the Web site provides the tickets at the locked-in rate specified by insurance policy 60 and receives compensation from central controller 200 for the amount of insurance adjustment 80.

Insurance policy 60 tracking number can also be used in the conversion of digital cash from one currency to another. The end user provides a quantity of digital cash to be converted along with the tracking number of insurance policy 60 to an online bank offering foreign exchange. The bank verifies the validity of insurance policy 60 with central controller 200, and accesses the locked-in exchange rate of insurance policy 60. Assuming the locked-in rate is more favorable and sufficient amount of coverage remains, the bank completes the conversion of funds at the locked-in exchange rate, electronically transferring the new currency back to the end user for storage at end-user interface 300.

Alternatively, this digital money could be transferred to a stored value card, such as a smart card, so the end-user can use the money for transactions away from end-user interface 300. The practice of using digital cash protocols to affect payment is well known in the art and need not be described here in detail. For reference, one of ordinary skill in the art may refer to Daniel C. Lynch and Leslie Lundquist, *Digital Money*, John Wiley & Sons (1996); or Seth Godin, *Presenting Digital Cash* (1995).

Central controller 200 can also create a digital code incorporating all of the information in insurance policy 60. This digital code is encrypted with a private key of central controller 200 and transmitted to the end user. The end user presents this digital code to a bank along with a request for currency exchange. The bank decrypts the digital code with the public key of central controller 200 and extracts all of the details of insurance policy 60, allowing the bank access to the locked-in exchange rate without having to contact central controller 200. The bank is assured that the digital code is legitimate because only central controller 200 has access to the private key that originally encrypted the digital code.

This digital code may also be stored in a smart card. In that case, the end user need only swipe the card through a smart card reader to provide the digital code.

Cryptographic Authentication

The system can also provide additional security measures to ensure the integrity of data communications. One protocol is authenticating authorship of end user communications, i.e., checking an attached ID or name and comparing it with those stored in end-user database 255. Additionally, cryptographic protocols may be added to the authentication process. These protocols enhance the ability to authenticate the sender of a message and verify the integrity of the communication itself, proving that it has not been altered during transmission. Encryption can also prevent eavesdroppers from learning the contents of the communication. Such techniques shall be referred generally as cryptographic assurance methods and will include the use of both symmetric and asymmetric keys as well as digital signatures and hash algorithms.

The practice of using cryptographic protocols to ensure the authenticity of senders as well as the integrity of communications is well known in the art and need not be described here in detail. Any conventional cryptographic protocols such as those described in Bruce Schneier, *Applied Cryptography, Protocols, Algorithms, and Source Code In C* (2d ed. 1996), could be used in accordance with the present invention.

Figure 18:
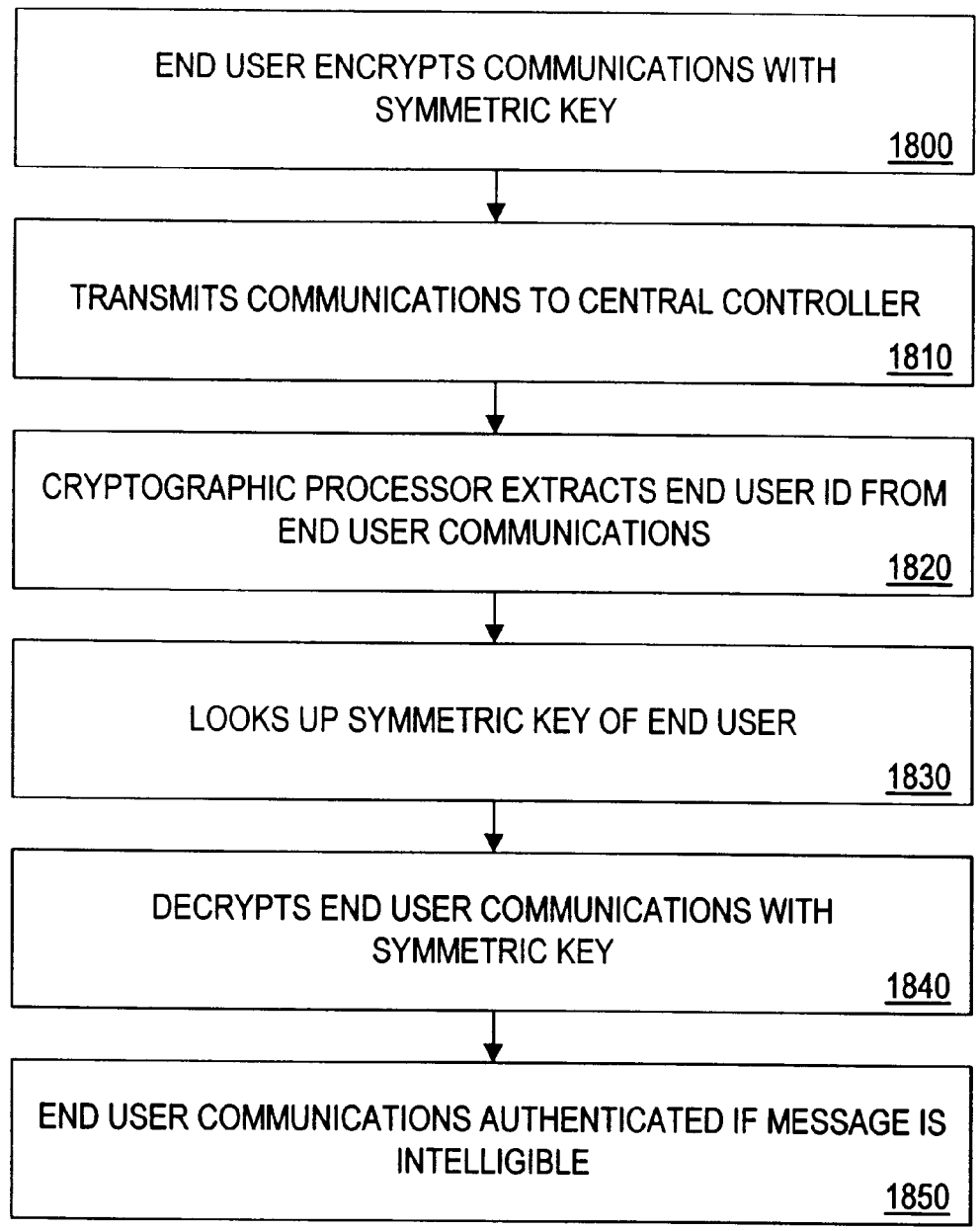
FIG. 18 is a flowchart illustrating an authentication procedure using symmetric key protocols.

FIG. 18 is a flowchart illustrating an exemplary authentication procedure using symmetric key protocols in which the end user and central controller 200 share a key. Thus, both encryption and decryption of end user communications are performed with the same key. This encryption may be implemented with an algorithm such as DES (U.S. Government standard, specified in FIPS PUB 46), or with any of several algorithms known in the art such as IDEA, Blowfish, RC4, RC2, and SAFER.

The end user encrypts communications with an assigned symmetric key (step 1800), using cryptographic processor 210 of end-user interface 300. The end user communication is then transmitted to cryptographic processor 210 of central controller 200 (step 1810). Cryptographic processor 210 extracts the end-user ID from the end-user communication (step 1820), looks up the symmetric key of the end user in cryptographic key database 295 (step 1830), and decrypts end-user communications with this key (step 1840). Cryptographic key database 295 contains algorithms and keys for encrypting, decrypting and/or authenticating communications. If the resulting communication is intelligible, then it is determined to have been encrypted by the same key, thus authenticating the end user as the author of the message (step 1850).

This procedure makes it difficult for unauthorized end users to represent themselves as legitimate end users. Without cryptographic procedures, an unauthorized end user who obtained a sample communication from a legitimate end user may be able to extract the end-user ID and then attach this ID number to unauthorized communications. When end user communications are encrypted with a symmetric key, however, an unauthorized end user obtaining a sample end user communication only discovers the end user's ID number, not the symmetric key. Without this key, the unauthorized end user cannot create an end-user communication that will fool central controller 200, since the unauthorized end user cannot encrypt the communication the same way as the authorized end user. The symmetric key protocol also ensures that the end-user communication has not been tampered with during transmission because alteration of the communication requires knowledge of the symmetric key. An encrypted end-user communication provides the end user with greater anonymity.

Figure 19:
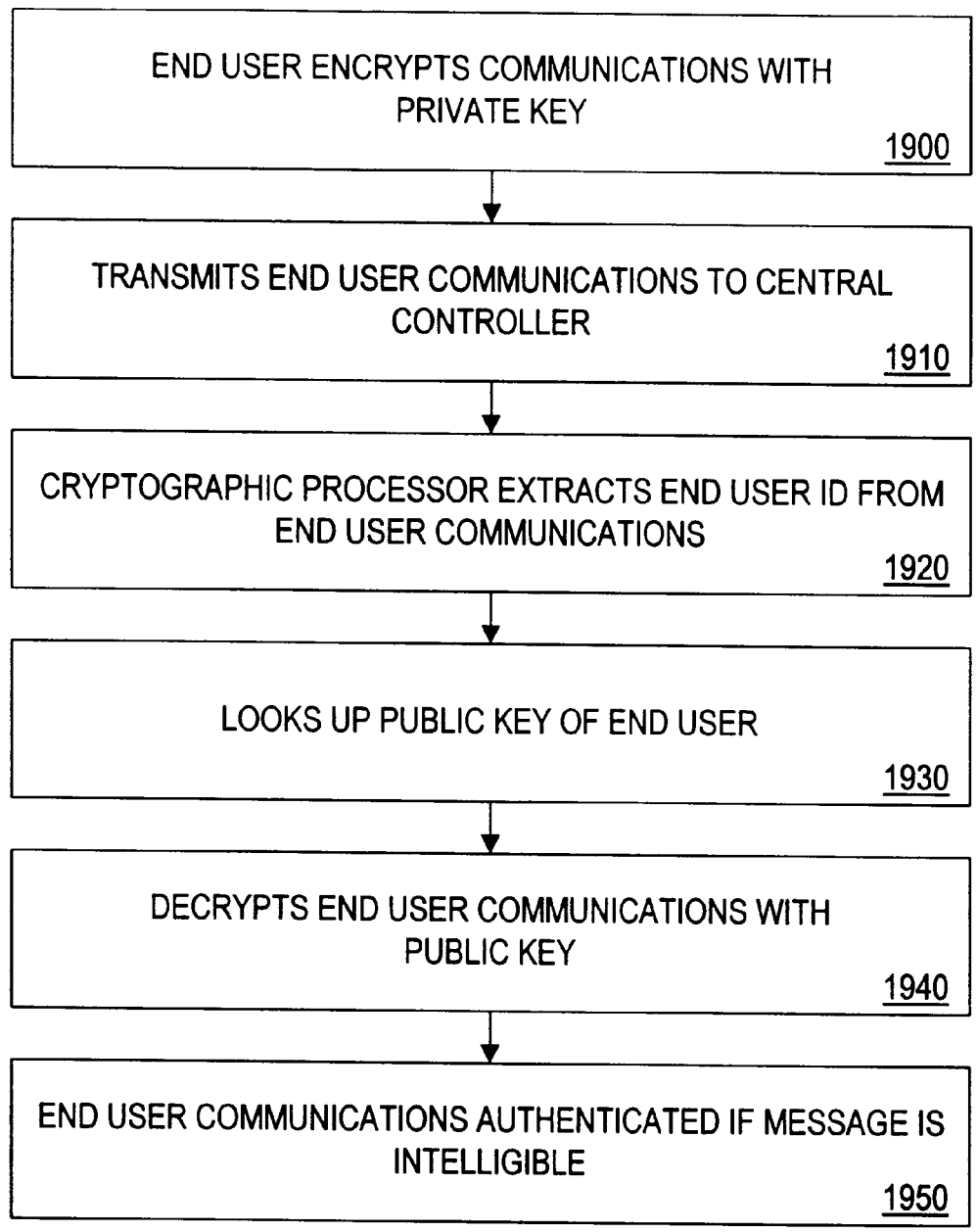
FIG. 19 is a flowchart illustrating an authentication procedure using public key protocols.

FIG. 19 is a flowchart illustrating an exemplary asymmetric key protocol in which the end-user communication is encrypted with a private key and decrypted with a public key. Two such algorithms for asymmetric key protocols are RSA and DSA. The end user encrypts the communication with a private key using the cryptographic processor of end-user interface 300 (step 1900), and transmits communication to central controller 200 (step 1910). Cryptographic processor 210 extracts the end-user ID (step 1920), and looks up the end user's associated public key in cryptographic key database 295 (step 1930), and decrypts the communication with this public key (step 1940). As before, if the communication is intelligible then central controller 200 has authenticated the end user (step 1950). Again, unauthorized end users obtaining the communication before it is received by central controller 200 are unable to alter it undetectably since the intruders do not know the private key of the end user. Unauthorized end users may, however, be able to read the message if they obtain the public key of the end user. Communication secrecy is preserved if the end user encrypts the communication with the public key, requiring the intruder to know the end user's private key to view the communication.

CONCLUSION

The present invention provides foreign exchange insurance policies to individuals as well as large corporate entities and offers protection against unpredictable foreign exchange rate fluctuations. Additionally, the present invention provides a way of automatically processing transactions covered by the foreign exchange insurance policies.

It will be apparent to those skilled in the art that various modifications and variations can be made in the present invention and in construction of the invention without departing from the scope or spirit of the invention. Other embodiments of the invention will be apparent to those skilled in the art from consideration of the specification and practice of the invention disclosed herein. The specification and examples should be considered as exemplary only, with the true scope and spirit of the invention indicated by the following claims.

What is claimed is:

1. A method of calculating a premium for a foreign exchange insurance policy, comprising:

receiving from a user a policy requirement for the foreign exchange insurance policy;

accessing data corresponding to a currency associated with the foreign exchange insurance policy;

and determining the premium based on the policy requirement and the accessed data.

2. The method of claim 1, further comprising storing the policy requirement.

3. The method of claim 1, further comprising providing an indication of the premium to the user.

4. The method of claim 1, further comprising arranging for the user to provide a payment based on the premium.

5. The method of claim 1, wherein said determination is based on a currency volatility.

6. The method of claim 1, wherein said determination is based on a type of currency.

7. The method of claim 1, wherein said determination is based on an exchange rate.

8. The method of claim 1, wherein said determination is based on an amount of coverage.

9. The method of claim 1, wherein said determination is based on an amount of coverage.

10. The method of claim 1, wherein the foreign exchange insurance policy is associated with a financial account of the user.

11. The method of claim 1, wherein said receiving comprises receiving information through a communication network.

12. The method of claim 1, further comprising providing to the user a policy code associated with the foreign exchange insurance policy.

13. The method of claim 12, wherein the policy code includes information about the foreign exchange insurance policy.

14. The method of claim 1, wherein said determination is based on a period of coverage.

15. The method of claim 14, wherein the policy requirement comprises the period of coverage.

16. The method of claim 15 wherein the policy requirement comprises at lease one of: (i) a policy start date; (ii) a policy end date; and (iii) a policy duration.

17. A device to calculate a premium for a foreign exchange insurance policy, comprising:

a processor; and a storage device coupled to said processor and storing instructions adapted to be executed by said processor to:

receive from a user a policy requirement for the foreign exchange insurance policy;

access data corresponding to a currency associated with the foreign exchange insurance policy; and determine the premium based on the policy requirement and the accessed data.

18. A medium storing instructions adapted to be executed by a processor to perform a method of calculating a premium for a foreign exchange insurance policy, said method comprising:

receiving from a user a policy requirement for the foreign exchange insurance policy;

accessing data corresponding to a currency associated with the foreign exchange insurance policy; and determining the premium based on the policy requirement and the accessed data.

19. A method of receiving an indication of a premium for a foreign exchange insurance policy, comprising:

providing to a central controller a policy requirement for the foreign exchange insurance policy; and receiving the indication of the premium, the premium being based on the policy requirement.

20. The method of claim 19, further comprising providing a payment based on the premium.

21. The method of claim 19, wherein the foreign exchange insurance policy is associated with a financial account of the user.

22. The method of claim 19, wherein said providing comprises providing information through a communication network.

23. The method of claim 19, further comprising receiving a policy code associated with the foreign exchange insurance policy.

24. The method of claim 23, wherein the policy code includes information about the foreign exchange insurance policy.

25. A device to receive an indication of a premium for a foreign exchange insurance policy, comprising:

a processor; and a storage device coupled to said processor and storing instructions adapted to be executed by said processor to:

provide to a central controller a policy requirement for the foreign exchange insurance policy; and receive the indication of the premium, the premium being based on the policy requirement.

26. A medium storing instructions adapted to be executed by a processor to perform a method of receiving an indication of a premium for a foreign exchange insurance policy, said method comprising:

providing to a central controller a policy requirement for the foreign exchange insurance policy; and receiving the indication of the premium, the premium being based on the policy requirement.

* * * * *